United States Patent [19]
Katz et al.

[11] 4,035,243
[45] July 12, 1977

[54] METHOD AND APPARATUS FOR HIGH VOLUME DISTILLATION OF LIQUIDS

[76] Inventors: Jerome Katz, P.O. Box 1544; Sidney J. Fogel, P.O. Box 1856, both of Rochester, N.Y. 14603

[21] Appl. No.: 681,290

[22] Filed: Apr. 28, 1976

[51] Int. Cl.² .................. B01D 3/06; B01D 1/28
[52] U.S. Cl. ................... 203/24; 60/39.57; 60/39.58; 60/648; 60/649; 202/160; 202/162; 202/172; 202/173; 202/180; 202/182; 203/11; 203/26; 203/100; 203/DIG. 14; 203/DIG. 16; 203/DIG. 17; 203/DIG. 20
[58] Field of Search .......... 202/234, 182, 160, 172, 202/173, 177, 180, 205, 162; 203/100, 2, 24, 26, 10, 11, 88, DIG. 20, DIG. 8, DIG. 4, DIG. 17, DIG. 16, DIG. 14; 60/648, 649, 39.57, 39.58

[56] References Cited
U.S. PATENT DOCUMENTS

| 12,304 | 6/1917 | Lillie | 203/DIG. 20 |
|---|---|---|---|
| 2,515,013 | 7/1950 | Kruhmin | 202/182 |
| 2,589,406 | 3/1952 | Latham | 203/24 |
| 3,351,537 | 11/1967 | Peterson | 203/DIG. 20 |
| 3,423,293 | 1/1969 | Holden | 203/26 |
| 3,425,914 | 2/1969 | Kanaan | 203/DIG. 20 |
| 3,505,171 | 4/1970 | Grow | 203/24 |
| 3,649,469 | 3/1972 | MacBeth | 203/DIG. 20 |
| 3,879,266 | 4/1975 | Sorensen | 203/26 |

*Primary Examiner*—Wilbur L. Bascomb, Jr.
*Attorney, Agent, or Firm*—Stuart J. Friedman

[57] ABSTRACT

A method and apparatus for high volume distillation of impure liquid comprises evaporating the impure liquid in an evaporator to form a vapor at a temperature above the freezing point and at or below the boiling point of said liquid at atmospheric pressure and at a pressure corresponding to the evaporation temperature under saturated conditions; compressing said vapor adiabatically; admixing in a mixing chamber the compressed vapor under substantially isobaric conditions directly with hot gases having a temperature sufficiently greater than the temperature of the compressed vapor that the resulting vapor-gas mixture temperature is greater than the temperature of the compressed vapor prior to the mixing; passing the vapor-gas mixture through an expansion engine to motivate the engine and to produce shaft energy, whereby the vapor-gas mixture adiabatically expands and cools; compressing the expanded vapor-gas mixture adiabatically in an independently powered compressor to a predetermined pressure corresponding to a predetermined temperature differential between the compressed vapor-gas mixture and the impure liquid; cooling the vapor-gas mixture in heat transfer relation with the impure liquid whereby the vapor at least partially condenses, transferring sufficient heat to the impure liquid for evaporating the liquid and to form the aforementioned vapor; and collecting the condensed vapor.

68 Claims, 15 Drawing Figures

METHOD AND APPARATUS FOR HIGH VOLUME DISTILLATION OF LIQUIDS

The present invention relates to a method and apparatus for economically and efficiently purifying and recovering high quality water from waste water and, more particularly, to a method and apparatus which permits evaporation and vapor compression treatment of large volumes of impure water.

The need for very large volumes of high quality water arises in many contexts. Many industries require large quantities of good quality water as input or raw material in order to operate. For example, the paper or textile industries utilize tremendous volumes of such water for their dyeing and bleaching operations. Many more industries discharge large quantities of waste or contaminated aqueous solutions to the environment. However, with the continuing decline in quality of the water in our lakes, rivers and streams and the continuing promulgation by federal, state and local governments of statutes and ordinances regulating the quality of water dumped into waterways, there is an increasing need for economical methods by which industrial waste streams can be cleaned prior to discharge. Still another area which requires the treatment of large volumes of water in an efficient and economical fashion is the production of potable water from the oceans by desalination. Thus, the problem of waste water treatment in high volumes includes the treatment of impure water as well as sea or brackish water. It also includes the treatment of water containing inorganic or organic impurities or materials where it is desired to separate and recover the water and/or to separate and recover the materials. In a broader sense the problem is not limited to water or aqueous solutions but extends to non-aqueous solutions as well where the components can be substantially separated by the method of distillation. Therefore, all possible feed solutions for liquid separation of the solvent from other constituents of the solution, whether the solvent is aqueous or not, are emcompassed within the term "impure liquid" as used herein.

There have been endless suggestions for treating industrial waste and sea water, including multistage distillation plants, thermo-mechanical distillation systems, and the like. However, any system heretofore suggested which has been capable of treating the millions of gallons per day necessary to effectively deal with industrial waste or to produce meaningful quantities of potable water have been hopelessly impractical or uneconomical in terms of their capital equipment or energy requirements. A good illustration of this is the system disclosed in U.S. Pat. No. 3,423,293 to Holden, which is a thermo-mechanical system for distilling impure waste at one atmosphere. The Holden system includes, sequentially, a boiler for evaporation of the water, a compressor, heat exchange means for adding heat to the compressed vapor, a turbine motor for driving the compressor and a condenser unit for extracting the heat of vaporization from the vapor and for transferring this extracted heat to the impure feed liquid at one atmosphere. Although Holden makes a seemingly appealing case of the economics of his system, when practical thermodynamic considerations are imposed it becomes apparent that in order to treat large volumes of water in the Holden system, e.g., 1,000,000 gal/day or 125,000 gal/hr, would require almost 400,000 ft$^2$ of condenser heat transfer area. Using commercially available condensers, this means that a typical 20 inch wide condenser would have to be 5,845 feet long. If the condenser size were increased to 5 feet wide, a condenser length of 650 running feet would be required. The capital costs involved in building a support structure for such a condenser unit are too impractical to consider.

It is therefore an object of this invention to provide an economical yet practical system for high volume purification of impure liquid sources.

It is another object of this invention to provide a thermo-mechanical distillation system capable of purifying large volumes of impure liquids and converting them to potable, or at least dumpable, liquid without imposing unreasonable equipment or energy requirements.

It is still another object of the invention to provide a heat and work input system wherein maximum heat and work input efficiencies are practiced.

It is yet another object of the invention to provide a system capable of purifying millions of gallons per day of waste water while at the same time providing a thermal energy reserve which can be used as such or converted to mechanical or electrical energy.

It is another object of the invention to provide a method of liquid distillation and recovery of the liquid in purified form by evaporation-vapor compression techniques using a turbine compressor in axial combination with a hot gas direct mixing chamber, a turbine motor, and a second, independently operated compressor, all in conjunction with a latent heat regenerative evaporative boiler.

Other objects and advantages will become apparent from the following description and appended claims.

Briefly stated, in accordance with the aforesaid objects, the present invention comprises a method, and a system for practicing the method, for purifying large volumes of impure liquid by evaporating the liquid in a boiler under reduced pressure, compressing adiabatically the resulting vapor to a pressure substantially in excess of the vaporization pressure, directing the compressed vapor into a mixing chamber where it is directly and isobarically mixed with a volume of hot gas, e.g., combustion gas, which mixing has the effect of increasing the vapor temperature, adiabatically expanding the vapor through a turbine wherein the vapor does a quantity of work equal to that done on it by the first compressor with the result that the vapor temperature and pressure decrease, increasing the temperature and pressure of the vapor exiting the turbine, e.g., by adiabatically compressing the vapor in a second compressor which is independently operated, and passing the resulting vapor through a condenser, such as the condenser side of the boiler, wherein the vapor will, upon condensing, give up at least enough thermal energy to vaporize the feed liquid. According to this method, maximum utilization is made of available thermal energies with the result that more efficient and economical high volume purification can be accomplished than with any other method heretofore known. Moreover, the system of the present invention, because its operation is independent of the method of evaporation, e.g., vacuum or flash distillation are both suitable, is extremely flexible in terms of its utility, and physical location. In the most common usage, where the impure liquid is impure water, the system is able to furnish large quantities of useful thermal energy, in the form of steam, in addition to large quantities of purified water.

The invention will be better understood from the following description considered together with the accompanying drawings, wherein like numerals designate like components, in which.

The invention will be better understood and appreciated from a consideration of a preferred embodiment thereof which, for purposes of descriptive clarity, includes only a single-effect evaporative unit. It is of course appreciated, as is well known in the art, that multi-effect evaporative systems have many efficiencies which recommend them in practical usage. The present invention, as will be seen from the description of additional embodiments, contemplates the use of multi-as well as single-effect evaporative units. In addition, the invention contemplates both vacuum and flash evaporation as well as any other known evaporative techniques for producing high volumes of vapor at $P_1$, $T_1$, as will more clearly appear hereinafter. It is, however, preferred to use vacuum evaporation or vacuum distillation in most instances due to the greater flexibility it affords in terms of plant location.

Figure 1:
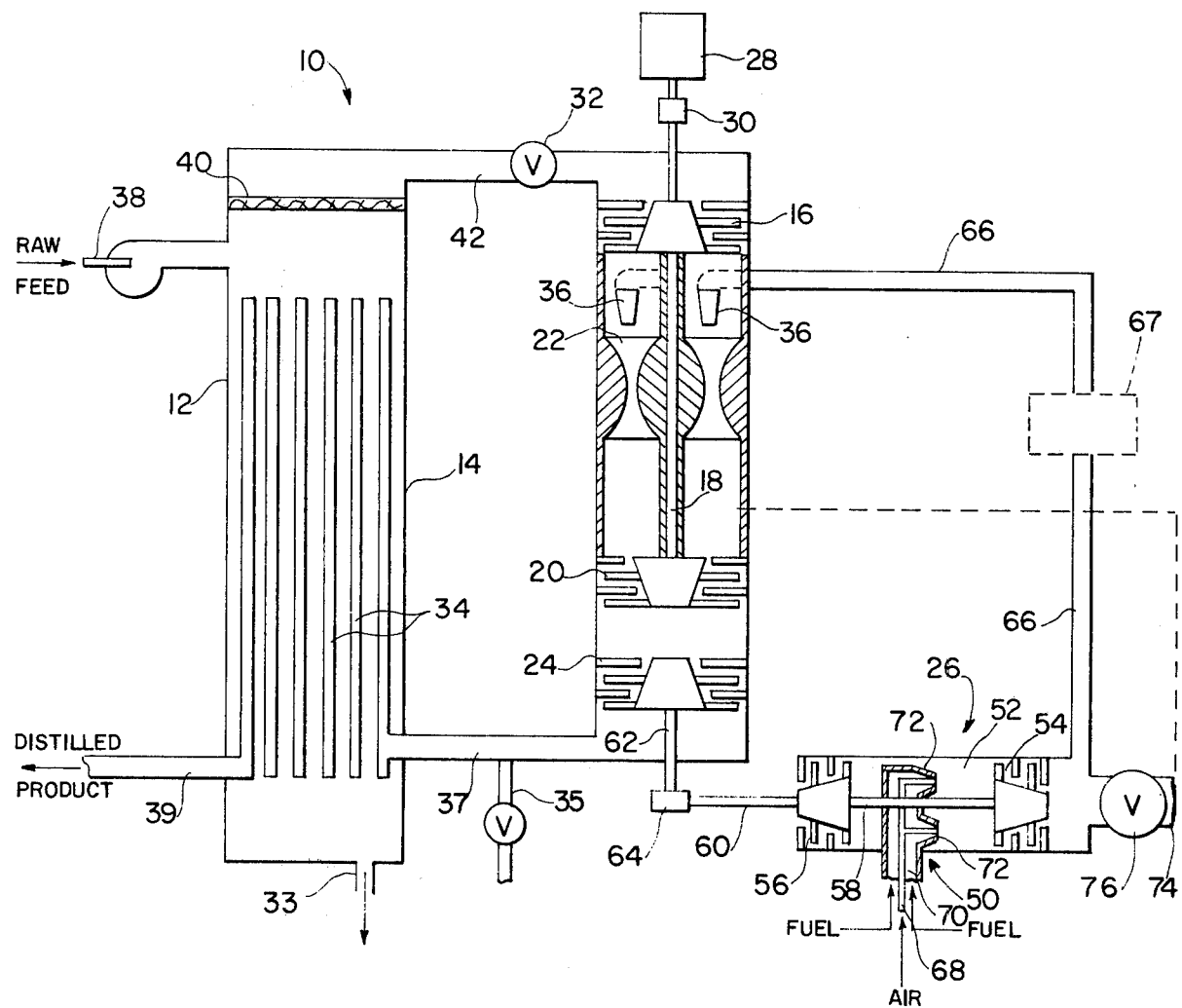
FIG. 1 illustrates schematically a single stage embodiment of the purification system of the present invention showing an exemplary means for operating the independent compressor and furnishing the combustion gas.

Referring now to FIG. 1, a vacuum distillation-vapor compression system is shown generally at 10. The system consists in its essential aspects of a boiler unit 12 including a condenser section 14 therein, a turbine compressor 16 operated through shaft 18 by turbine motor 20, a mixing chamber 22 upstream of the turbine motor 20, an independent second compressor 24 downstream of the turbine motor 20 and means 26 for supplying hot gases to mixing chamber 22. To understand the operation of the system 10, the path of raw feed, e.g., impure water, therethrough can be charted. Initially, starter motor 28 is energized to rotate shaft 18 through clutch and gear box 30. Compressor 16 and turbine 20, which are linked to shaft 18, also rotate when the electric motor 28 is operated. During start-up the compressor 16 is allowed to rotate for a time sufficient for a vacuum to be drawn on the evaporative side of boiler 12. The extent of the vacuum is predetermined, as will be seen hereinafter, based upon the desired operating parameters of the system and the temperature of the influent impure water and is controlled and monitored by variable pressure valve 32 in duct 42 joining the boiler 12 and first compressor 16. Means 26 for supplying hot gases to mixing chamber 22 are operated to motivate turbine 20 to keep it running during start-up and to heat the tubes 34 in condenser section 14.

In this embodiment, motive system 50 constitutes means for supplying the hot gases although it will be appreciated that any known way of providing high temperature, high pressure gases, e.g., burning garbage at high temperature to produce high temperature, high pressure steam, may be used. At the same time, motive system 50 operates independent compressor 24. The motive system, which may be a gas turbine engine, includes, a combustion chamber 52 wherein hot combustion gases are produced, a turbine motor 54 operated by the hot combustion gases, and compressor 56 linked to turbine 54 through shaft 58, shafts 60 and 62 linking turbine 54 through clutch and gear box 64 to independent compressor 24, and duct 66 for carrying the hot combustion gases to mixing chamber 22. Combustion chamber 52 is supplied by a compressed air duct 68 and a fuel duct 70 through air and fuel injectors 72. The fuel to air ratio is maintained for complete combustion of all fuel. Preferably, the burning fuel is supplied with an excess of air through duct 68, which may use as its source a small compressor or super charger (not shown) operated from shafts 58 or 60, so that the fuel burns to completion producing only carbon dioxide and steam as clean combustion products. The clean combustion gases together with the air drawn through compressor 56 operate turbine 54 and the combustion gas and air exhaust from the turbine exits by duct 74, controlled by servo-operated valve 76 which monitors the temperature in the space downstream of mixing chamber 22, and duct 66, which supplies clean combustion gases to the mixing chamber 22 through gas injectors 36. When the temperature downstream of the gas injectors 36 becomes too high, valve 76 opens to divert some of the combustion gas away from the mixing chamber 22 until the temperature stabilizes to the desired level. An optional combustion gas cleaning unit 67, shown in phantom in FIG. 1, may be interposed along duct 66 to clean the gases in the event that combustion is incomplete or impurities enter the system with the fuel or air. Suitable gas cleaning units are well known and include, for examples scrubbers, electrostatic precipitators, chemical precipitators, and the like.

Feed water enters system 10 through duct 38 and is rapidly heated to the boiling temperature, which depends on the vacuum level in the boiler, by heat transfer from the condensing vapor in hot condenser tubes 34. Concentrated feed water waste, containing a large proportion of the impurities therein, is removed via discharge line 33. The vapor produced at $P_1$ and $T_1$ (the pressure and temperature in the boiler) is drawn through moisture separator 40 into duct 42 joining the boiler 12 and the first compressor 16 and is adiabatically compressed by compressor 16 to $P_2$ with a resulting heating of the vapor to $T_2$. The heated vapor mixes with the hot, clean combustion gases emitting from injectors 36 in mixing chamber 22, which may be a mixing injector, mixing aspirator, jet mixer or any other configuration known to be suitable for mixing vapors having different pressures in such a manner that a partial vacuum is created upstream of the actual mixing point. The partial vacuum is useful in drawing the non-injected vapor into the mixing chamber and thereby for enhancing the mixing. The temperature of the combustion gas is higher than the temperature of the heated vapor at this point although there is a substantially smaller flow rate of combustion gases than of vapor. The direct mixing results in an isobaric increase of vapor temperature by at least about 2° K to $T_3$ while pressure remains the same, i.e., $P_3$ equals $P_2$. The mixed vapor-combustion gas stream adiabatically expands through turbine 20 to reduced pressure and temperature $P_4$ and $T_4$ and, in so doing, does work $W_2$ on the turbine to operate it. Since the turbine 20 and compressor 16 are directly linked by shaft 18, the amount of work $W_2$ done by the vapor on the turbine is equal to the amount of work $W_1$ done on the vapor by the compressor, i.e., $W_1$ equals $W_2$. Inasmuch as the combustion gas serves primarily to heat the vapor and since the combustion gas flow rate is only a small fraction of the vapor flow rate (e.g., about 125,000 gal/hr of vapor to less than 1,000 gal/hr of combustion gas), the work $W_2$ is largely done by the vapor in a steady state condition. The expanded and reduced temperature vapor exhausting from the turbine 20 then passes through independent compressor 24 and is adiabatically compressed to increase its pressure to $P_5$ and its temperature to $T_5$. These pressure and temperature conditions, $P_5$ and $T_5$, represent the initial vapor conditions in the condenser tubes 34 as well. Therefore, the compression ratio in compressor 24 is selected to provide the desired temperature differential for effective heat transfer in the condenser tubes 34 from the condensing vapor to the feed water entering duct 38. The heat transfer temperature differential must be high enough that large volumes of feed water can be accomodated in this system within the practical limits imposed by reasonable condenser size. It is for achieving reasonable condenser size that the independent compressor is so important in this embodiment, particularly where, as here, the compression ratio of the independent compressor can be adjusted to accomodate variations in feed water flow rate and feed water temperature. Following condensation, purified condensate is drawn off through duct 39.

The independent compressor 24 need not, of course, be operated by a motive power system 50 as shown. Instead, the compressor could be operated directly by electrical or gasoline motor means. In such a case, combustion gas duct 66 would have to be connected to an alternative supply source for clean, hot gas, such as a pre-existing combustion gas source if system 10 were physically located near an industrial clean waste gas source, a separate fuel and air combustion gas generating source such as the combustion chamber, fuel and air supply ducts and injectors as shown in FIG. 1, or, a steam production means with thermal energy supplied by burning inexpensive fuel, such as garbage, or by other suitable means. One possible source for supplying a portion of the power needs of independent compressor 24 might be turbine motor 20, whereby excess power generated in motive system 50 could be transferred to turbine motor 20 and compressor 24 could be clutched and geared to turbine motor 20. However, the independence of compressor 24 cannot be economically dispensed with, such as if compressor 24 were shafted directly to turbine 20 and motive power system 50 were eliminated. It has been determined that the temperature increase in the mixing chamber 22 would have to be so high in order for turbine 20 to operate both compressor 16 and compressor 24 that due to the economics of operation, as a practical matter, this configuration is not preferred. Therefore, it is essential to the present invention that compressor 24 have a motive power source independent of turbine 20 for at least a substantial portion of its motive power requirements.

Figure 2:
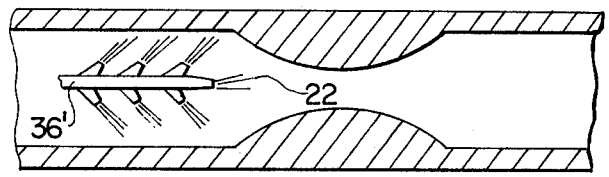
FIG. 2 illustrates a preferred configuration of the combustion gas injector disposed in the mixing chamber.

It is also essential to the invention that direct mixing of gases occur in the space between the first compressor 16 and turbine motor 22. Alternative vapor heating configurations, such as by heat exchange through a conventional heat exchanger as taught in U.S. Pat. No. 3,423,293 — Holden, is wasteful of thermal energy due to transfer inefficiencies and the resulting need for higher temperature heat transfer mediums, and is therefore uneconomical. Improved vapor and combustion gas mixing and more uniform temperature distribution along mixing chamber 22 can be achieved by use of multiple nozzle injectors 36' in chamber 22, as shown in FIG. 2.

The system illustrated in FIG. 1 and the embodiments to be described hereinafter are useful even when the impure liquid feed contains dissolved salts which can precipitate and form scale on the outside of the condenser tubes and on the boiler walls at relatively high evaporation temperatures. Because scale deposits interfere with efficient heat transfer between the condensing vapor in the tubes and the feed liquid in the boiler, it is undesirable to operate the system at a boiler temperature at which scaling occurs. Therefore, when sea water containing calcium sulfate, magnesium hydroxide, calcium carbonate, and the like, is the liquid feed, since these salts are more soluble in cold sea water than in sea water above about 160° F, at temperatures above 160° F scale will rapidly form on the hot tubes and condenser surfaces and will, in a short time, render the system operative only at very low thermal efficiencies. Therefore, if sea water is the liquid feed, boiler temperature ($T_1$) should be kept below 160° F and preferably below 150° F. The system can still treat very large volumes of liquid feed in an efficient manner by maintaining a vacuum in the boiler at a level such that the boiling of the liquid feed is accomplished within the no-scaling temperature limitations. The lower limit of $T_1$ is directed by practical considerations since the system is unsuited for treating solid feed. Therefore, $T_1$ should never be below the freezing point of water at ambient conditions, which at 1 atmosphere is 0° C (32° F) corresponding to a $P_1$ of 0.006 atm. $T_1$ maybe as high as the boiling point of water at 1 atmosphere, which is 100° C (212° F). However, if evaporation occurs at 1 atmosphere, it is expensive to create a sufficient temperature differential for condensation and latent heat transfer to the liquid feed. Accordingly, it is uneconomical in most cases to operate the system at $T_1$=100° C, particularly in cases where high throughput gallonage is desired. Highest volumes in gallonage are obtained when vapor is evaporated under saturated conditions at a vapor pressure less than one atmosphere. However, it should be appreciated that when $P_1$ is one atmosphere, certain capital costs can be saved by eliminating the independent compresser 24. It is not believed that this savings is sufficient to offset the economic loss due to low throughput gallonage under $P_1$=1 atmosphere conditions, and $P_1$=1 atmosphere operation is not a preferred form of this invention. Generally, maximum efficiencies and highest throughput can be achieved at pressures in the boiler corresponding to $T_1$ in the range from about 15° C to 60° C.

Figure 3:
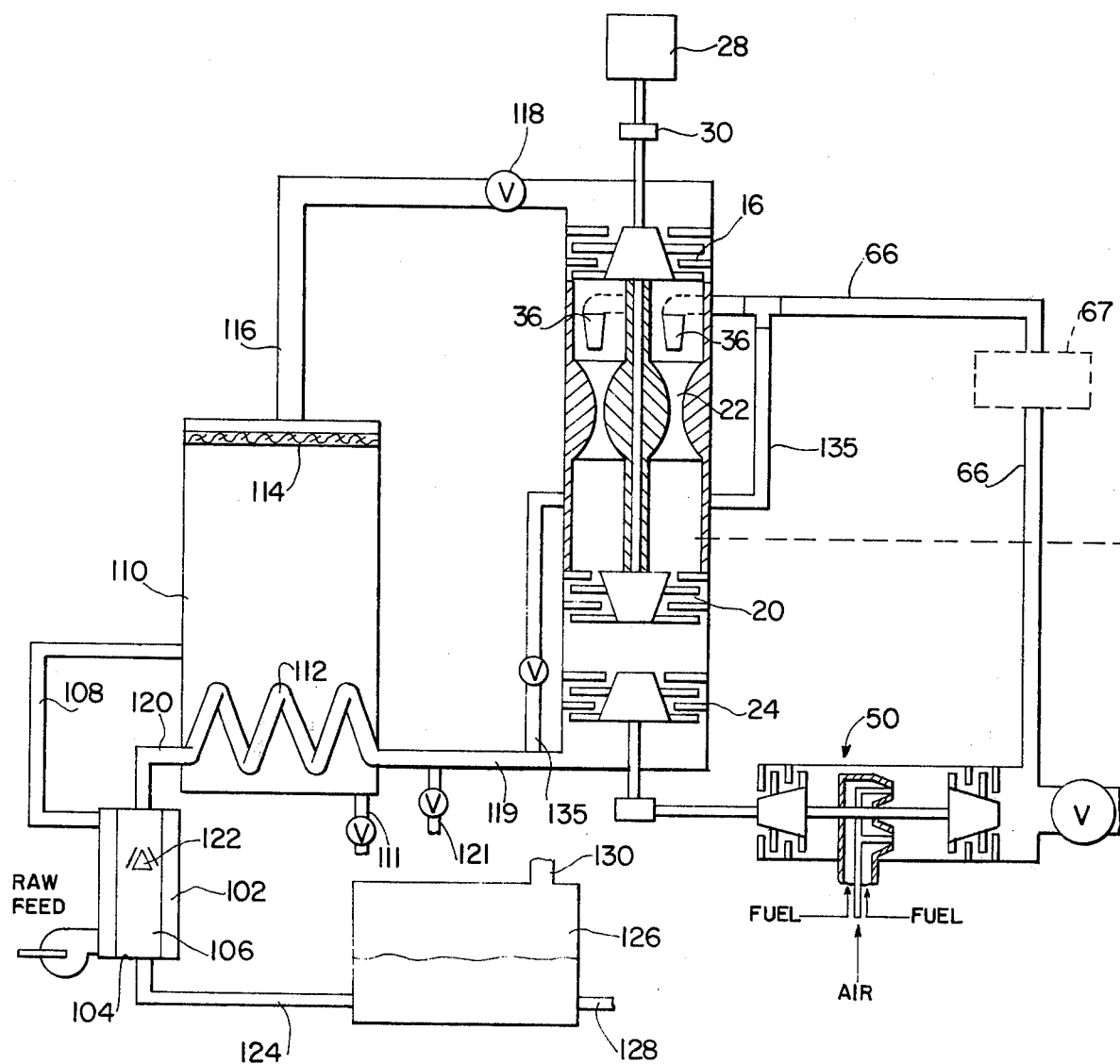
FIG. 3 illustrates schematically another single stage embodiment of the present invention.

Referring now to FIG. 3, the impure liquid feed enters the shell side 102 of the heat exchanger-condenser unit 104 where it is heated by passage of partially condensed vapor through the condenser side 106 of the unit. The heated feed in liquid form exits the shell side 102 via feed line 108 and enters vacuum distillation boiler 110 which is maintained at a selected vacuum $P_1$ controlled by pressure regulating valve 118. The feed liquid is rapidly heated to boiling temperature $T_1$ by vapor passing through and condensing in the condenser section coil 112 in boiler 110. The vapors pass out of boiler 110 through moisture separator 114 via vapor line 116 and valve 118 and are, sequentially, adiabatically compressed by compressor 16 to $P_2,T_2$, admixed and isobarically heated with hot, clean combustion gases emitting from injectors 36 in mixing chamber 22 to $P_3,T_3$, adiabatically expanded through turbine motor 20 to $P_4,T_4$, and re-compressed adiabatically in independent compressor 24 operated by motive power system 50 to $P_5,T_5$, all as described in connection with the embodiment of FIG. 1, before entering condenser section coils 112 via return line 119. In the condenser section 112 the vapors condense at least partially, transferring their latent heat to the feed liquid entering the boiler 110 through feed line 108. The almost completely condensed vapor exits condenser section coils 112 via line 120 and passes into the condenser side 106 of unit 104. Controlling flow through the condenser side 106, which is preferably a jet condenser having pressure and expansion chambers therein, is servo or spring controlled pressure valve 122 which serves to maintain the pressure on condenser side 106 of unit 104 and to assure that all vapors condense therein. Excess steam may be directed by line 121 so that the system remains in balance and too high a temperature does not develop in the feed water. Line 124 carries condensed vapor into storage container 126 from which pure condensate may be drawn for general usage through line 128. Non-condensible gases exit via vent 130. Concentrated waste liquid is removed from boiler 110 via line 111.

A portion of the vapor in return line 119 may be diverted via line 135 to duct 66 and then through injectors 36 to furnish an increased vapor flow to the turbine 20. If line 135 is utilized, the turbine 20 should preferably have waterways to take into account the possibility that in expanding the increased vapor through the turbine 20, a portion of the condensible vapor will in fact condense. The effect of diverting vapor flow through line 135 to turbine 20 is to increase the efficiency of the turbine by extracting as much work as possible from the vapor passing therethrough.

With the foregoing general description of the operation of two embodiments of a single stage vacuum distillation-vapor compression system serving to set forth the fundamentals of the present invention, before other embodiments and variations are described, it will be useful to consider the following more specific examples of the operation of the instant system. Accordingly, the following illustrative examples are offered by way of further explanation and are not intended to expressly or impliedly limit the scope of the invention.

EXAMPLE I

This Example utilizes impure water as the feed liquid and assumes an initial boiler temperature $T_1$ of 20° C or 293° K from which the initial vapor pressure in the boiler $P_1$ can be determined from standard charts to be 0.02307 atm. The chosen compression ratio for compressor 16 is 15:1, i.e., $P_2/P_1$=15/1.

From the ideal gas law applied to adiabatic compressions and expansions and assuming that the heat capacities at constant volume and pressure, $C_v$ and $C_p$, are constant, it is known that:

$$T_2/T_1 = (P_2/P_1)^b \tag{1}$$

where $b = \gamma - 1/\gamma$ and $\gamma = C_p/C_v$.

Adopting the physical constants for water disclosed in U.S. Pat. No. 3,243,293 — Holden, $b$=0,2445, and substituting $P_2 = 15P_1$ and $T_1 = 293°$ K into equation (1):

$$T_2 = 293 \ (15)^{0.2445} = 568.1° \text{ K } (295.1° \text{ C})$$

Inasmuch as the work $W_1$ done by the compressor 16 on the vapor is equal to the work $W_2$ done by the vapor and hot combustion gases on the turbine 20, the following formulae result:

$$W_1 = W_2 \tag{2}$$
$$W_1 = C_v (T_2-T_1); W_2 = -C_v (T_4-T_3) \tag{3}$$
$$C_v (T_2-T_1) = -C_v(T_4-T_3) \tag{4}$$
$$T_2-T_1 = T_3-T_4 \tag{5}$$

In order to minimize system costs, we allow the hot combustion gases to heat the output of compressor 16 only slightly to raise its temperature from $T_2$ to $T_2$+2. Thus, substituting $T_3$=$T_2$+2 in equation (5):

$$T_2-T_1 = T_2+2-T_4 \tag{6}$$
$$T_4 = T_1+2 \tag{7}$$

Using the known values of $T_1$ and $T_2$, we find:

$$T_3 = 568.1+2 = 570.1° \text{ K } (287.1° \text{ C})$$
$$T_4 = 293+2 = 295° \text{ K } (22° \text{ C})$$

The present system can permit $T_3 = T_2+2$ because the system places no constraint on the value of $P_4$.

Thus the vapor temperature in the system increases from $T_1 = 293.°$ K in the boiler to $T_2 = 568.1°$ K following adiabatic compression to $T_3 = 570.1°$ K following direct mixing with the combustion gases and then decreases to $T_4$ 32 295° K for the vapor exhausting in the turbine motor.

The vapor pressure in the system increases from $P_1 = 0.02307$ atm. in the boiler to $P_2 = 0.3460$ atm. following adiabatic compression, remains constant at $P_2 = P_3 = 0.3460$ atm. during isobaric heating in the direct mixing chamber and decreases to $P_4$ following adiabatic expansion in the turbine according to the following relationship:

$$T_4 = T_3 (P_4/P_3)^b \qquad (8)$$

which can be written as:

$$P_4 = P_3 (T_4/T_3)^{1/b} \qquad (9)$$

but since $P_3 = P_2$ and $b = 0.2445$:

$$P_4 = P_2 (T_4/T_3)^{1/b}$$

$$P_4 = 0.02338 \text{ atm.}$$

The temperature $T_5$ of the vapor following adiabatic compression in the independent compressor 24 can be calculated by using the appropriate compression relationship, similar to Equations (1) and (9), once the vapor pressure $P_5$ or compression ratio has been selected:

$$T_5 = T_4 (P_5/P_4)^b \qquad (10)$$

Applying Equation 10 to instances where $P_5 = 0.6$ atm, 0.8 atm, 1 atm and 2.5 atm. yields the following result:

| $P_5$ | $P_4$(atm) | $T_4(°$ K) | $T_5$ (° K) | $T_5(°$ C) |
|-----|-----|-----|-----|-----|
| 0.6 | 0.2338 | 295 | 652.2 | 379.2 |
| 0.8 | 0.02338 | 295 | 699.8 | 426.8 |
| 1.0 | 0.02338 | 295 | 739.0 | 466.0 |
| 2.5 | 0.02338 | 295 | 924.6 | 651.6 |

EXAMPLE II

To demonstrate that the instant system can in fact purify large volumes of impure water using equipment, specifically a condenser, of reasonable size and availability, the instance in Example I where $P_5 = 1$ atm. has been selected for further illustration. It is assumed herein that compressor 16 can maintain the boiler pressure $P_1$ at 0.02307 atmospheres by removing vapor therefrom as rapidly as it is produced. In this case, the rate of flow of the vapor is solely dependent on the rate that the heat of vaporization is transferred to the feed liquid. The heat of vaporization of water boiling at 20° C and 0.02307 atm. is 1053.8 BTU/lb. according to published tables and the temperature difference between the condensing vapor and the feed liquid at $P_5 = 1$ atm. is $\Delta T = T_5 - T_1$ or 446° C (802.8° F).

The surface area A in square feet of a condenser required to condense R gallons/hr of condensate at 20° C having a heat of varporization $H_c$ of 1053.8 BTU/lb through a temperature differential of 802.8° F in a stainless steel condenser having a coefficient of heat transfer $h$ of 250 BTU/hr $-°$ F $-$ ft$^2$ can be determined from the following relationship:

$$A = RH_c/h \Delta T \qquad (11)$$

Rewriting Equation 11 in terms of $R$:

$$R = Ah \Delta T/H_c \qquad (12)$$

Inserting the aforementioned values for $h$, $\Delta T$ and $H_c$ yields:

$$R = 23.807A \qquad (13)$$

It is known that a conventional condenser unit, such as is manufactured by th Pfaudler Company of Rochester, N.Y., which is 5 feet long and 5 feet wide has an effective surface area for heat transfer of 2988 ft.$^2$. Therefore the length L of such a unit necessary to provide A ft$^2$ of surface area is denoted by the formula:

$$(A/2988) \times 5 = L \qquad (14)$$

$$A = 2988L/5 \qquad (15)$$

Assuming a practical condenser length of 10 feet in Equation 15 indicates that a flow of $R = 142{,}271$ gallons/hr can be accomodated and condensed.

Now, it should be appreciated that the vapor returning to the condenser section coils is at a temperature ($T_5$) of 466° C (877.9° F) and a pressure ($P_5$) of 1 atmosphere and has to cool to 100° C (212° F) before it will condense. Thus, in cooling to 100° C, the vapor releases about 317.9 BTU/lb (see Table 5, Steam Tables, Electrical Research Association, St. Martins Press 1967) and in condensing at 100° C it releases an additional 970.2 BTU/lb amounting to a total of 1288.1 BTU/lb released when a pound of the vapor condenses from $P_5$, $T_5$. In addition, the condensate releases about 144 BTU/lb additional heat when it cools from 100° C to 20° C, making a total of 1432.1 BTU/lb released for each pound of vapor at 466° C condensing and cooling to 20° C (68° F).

However, only 1053.8 BTU/lb is required for every pound of water vaporized at 20° C and 0.02307 atm. in the boiler. This means that 1053.8/1432.1 = 0.7358/lbs. of vapor has to condense and cool to 20° C to supply the required amount of heat to vaporize each pound of liquid feed. There remains 0.2642 lbs. of vapor at 870.8° F uncondensed per pound of liquid feed water vaporized in the boiler. If a diverter line 35 (shown including a valve in FIG. 1) is junctioned into a vapor return line 37 to permit the quantity of vapor passing into the condenser tubes 34 to be controlled so that only the amount necessary to keep the system in balance (0.7358 lbs./lb feed) reaches the condenser, the remainder (0.2642 lbs./lb feed) can be diverted to other uses. As a result, instead of 142,271 gallon/hr of condensate alone being produced in the system, both condensate at 68° F and superheated steam at 870.8° F becomes available from the system in amounts of 104,683 gallon/hr of condensate and 300,704 lb/hr of steam.

Both the condensate and steam have a number of uses, for example:

a. the condensate can be used for drinking water or for industrial purposes that require pure water;

b. the steam can be used for heating or for producing electrical power;

c. the condensate can be heated by the steam to any temperature up to the boiling point by indirect heat exchange with the result, even if all condensate is heated to 100° C, that 0.7586 lbs of 100° C water/lb of feed water vaporized and 0.2412 lbs of steam at 100° C/lb of feed water vaporized can be produced;

d. the steam can be condensated at little cost, e.g., by using a finned radiator cooled by air blown over it where the blower is powered by the motive power system.

EXAMPLE III

The output of the system of Example I can be determined on the same basis as in Example II for the instance wherein $P_5$ is selected to be 0.6 atm. instead of 1 atm. and the vapor temperature exiting the independent compressor is 379.2° C (714.6° F). As in Example I, the liquid feed is presumed to boil at $T_1 = 20°$ C (68° F) at a pressure of 0.02307 atm. and to have a heat of vaporization, $H_c$, of 1053.8 BTU/lb. The temperature difference, $\Delta T = T_5 - T_1$ is 646.6° F.

From Equation 12, substituting the known values of $h$, $\Delta T$ and $H_c$ yields:

$$R = 19,175A \qquad (17)$$

Inserting Equation (15) for $A$ in Equation 17 we get:

$$R = 11,458.8L \qquad (18)$$

Assuming a practical condenser length of 10 feet in Equation 18 results in $R = 114,588$ gallon/hr condensate.

The vapor at $T_5$ of 374.2° C (714.6° F) and $P_5$ of 0.6 atmospheres must cool to 86.2° C (187.2° F) before it will condense. Thus, in cooling to 86.2° C the vapor releases about 254.5 BTU/lb and in condensing at 86.2° C it releases 985.5 BTU/lb making a total of 1240 BTU/lb released in cooling and condensing from $P_5$, $T_5$. In addition, the condensate releases another 119.2 BTU/lb as it cools from 86.2° C to 20° C. Therefore, the total heat released is 1359.2 BTU/lb for every pound of vapor condensed and cooled to 20° C.

However, as indicated in Example II, only 1053.8 BTU/lb is needed for each pound of liquid feed vaporized at 20° C and 0.2307 atmospheres in the boiler. This means that 1053.8/1359.2 = 0.7753 lbs of vapor has to condense and cool to 20° C to supply the required amount of heat to vaporize each pound of liquid feed. There remains 0.2447 lbs of vapor at 714.6° F uncondensed per pound of water vaporized in the boiler. If the diverter line 35 shown in FIG. 1 is junctioned into return line 37, 0.2247 lbs of vapor per pound of feed can be diverted to other uses and the remaining 0.7753 lbs of vapor per pound of feed can be used to keep the system in thermal balance. As a result, the system operated at $P_5 = 0.6$ atm. can produce as much as 114,588 gallon/hr of condensate at 20° C or 88,840 gallon/hr of condensate at 20° C and 205,983 lb/hr of vapor at 379.2° C.

EXAMPLE IV

Example I was repeated using a feed liquid consisting of impure water and assuming an initial boiler temperature $T_1$ of 50° C or 323° K from which the initial vapor pressure in the boiler $P_1$ can be determined to be 0.1217 atm. The compression ratio of compressor 16 is selected to be 15:1, i.e., $P_2/P_1 = 15/1$.

Applying Equation (1), $T_2$ is 626.3° K (353.3° C), $P_2 = 15P_1 = 1.8255$ atmospheres. Making the same assumption as in Example I with respect to isobaric mixing in the mixing chamber, $T_3 = T_2+2$ and $T_4 = T_1+2$. Thus, the vapor temperature in the system increases from $T_1 = 323°$ K in the boiler to $T_2 = 626.3°$ K following adiabatic compression to $T_3 = 628.3°$ K following isobaric mixing and decreases to $T_4 = 325°$ K for the vapor exhausting the turbine motor.

The vapor pressure in the system increases from $P_1 = 0.1217$ atm in the boiler to $P_2 = P_3 = 1.8255$ atmospheres during adiabatic compression and isobaric heating and decreases to $P_4$, which can be determined from Equation (9) to be 0.1232 atmospheres, following adiabatic expansion in the turbine.

Applying Equation (1) to instances where $P_5 = 0.6$ atm, 1 atm and 2.5 atm. yields the following result:

| $P_5$(atm) | $P_3$(atm) | $T_4$(° K) | $T_5$(° K) | $T_5$(° C) |
|---|---|---|---|---|
| 0.6 | .1232 | 325 | 478.6 | 205.6 |
| 0.8 | .1232 | 325 | 513.5 | 240.5 |
| 1.0 | .1232 | 325 | 542.3 | 269.3 |
| 2.5 | .1232 | 325 | 678.5 | 405.5 |

EXAMPLE V

The output of the system of Example IV can be determined on the same basis as in Examples II and III with $P_5$ selected for illustrative purposes as:

a. 1 atmosphere;
b. 0.6 atmospheres.

The liquid feed is presumed to boil at $T_1 = 50°$ C at a pressure $P_1 = 0.1217$ atm and to have a heat of vaporization, $H_c$, of 1024.0 BTU/lb. The temperature differential, $\Delta T = T_5 - T_1$, depends on the selected $P_5$. For each $P_5$ selected, the $\Delta T$ and value of R calculated from Equations (12) and (15) for a stainless steel condenser are as follows:

| | $T_5$ | $\Delta T$ | R(based on A) | R(based on L) |
|---|---|---|---|---|
| (a) | 269.3° C | 219.3° C (394.7° F) | 12.045A | 7198.1L |
| (b) | 205.6° C | 155.6° C (280.1° F) | 8.548A | 5108.2L |

Assuming $L = 20$ feet in order to get results comparable to the $T_1 = 20°$ C cases, the condensate flow rate is calculated as follows:

a. $R = 143,962$ gallon/hr
b. $R = 102,165$ gallon/hr

Considering now that the vapor at $T_5$ and $P_5$ must cool to the condensation temperature of water at $P_5$ before it will condense, that at the condensing temperature the vapor releases its heat of condensation, and that the condensate then releases further heat in cooling to 50° C, the following summarizes the heat released by the vapor:

a. At $P_5 = 1$ atm., the vapor cools from 269.3° C to 100° C before condensing, releasing 145.02 BTU/lb in the process. During condensation at 100° C the vapor releases 970.2 BTU/lb. In cooling to 50° C, the condensate releases an additional 90 BTU/lb for a total heat release of 1205.22 BTU/lb for every pound of vapor condensed and cooled to 50° C.

b. At $P_5 = 0.6$ atm., the vapor cools from 205.6° C to 86.2° C before condensing, releasing 103.7 BTU/lb in the processs. During condensation at 86.2° C the vapor releases 985.5 BTU/lb. In cooling to 50° C, the condensate releases an additional 65.2 BTU/lb for a total heat release of 1154.4 BTU/lb. for every pound of vapor condensed and cooled to 50° C.

However, only 1024 BTU/lb is needed for each pound of liquid feed vaporized at 50° C and 0.1217 atm. in the boiler. This means that only a fraction of the vapor has to condense and cool to 50° C to supply the required amount of heat to vaporize each pound of liquid feed. There remains a substantial fraction of vapor at $T_5$ uncondensed per pound of water vaporized in the boiler. Thus, by diverting a portion of the vapor to line 35 from return line 37 shown in FIG. 1, the system can be kept in thermal balance while the uncondensed vapor is used for other purposes. The following table shows the fractional amount of condensate which can be produced at 50° C in each system (a) and (b) and the fractional amount of steam available at $T_5$ and $P_5$:

|  | $P_s$(atm) | $T_s$(° C) | FRACTIONAL STEAM AT $T_s$ | FRACTIONAL CONDENSATE AT $T_1$ |
|---|---|---|---|---|
| (a) | 1 | 269.3 | .1504 | .8496 |
| (b) | 0.6 | 205.6 | .1130 | .8870 |

It can be seen from Examples I-V that as $T_1$ in the boiler approaches $T_5$, i.e., as $\Delta T$ decreases, the system output of condensate also decreases, compelling the use of a longer condenser to increase available heat transfer area. The following Table I summarizes the results of Examples II, III and IV with respect to the relationship between system output, condenser surface area and final and initial system temperatures:

TABLE I

| $P_1$ (atm) | $T_1$ (° C) | $P_s$ (atm) | $T_s$ (° C) | CONDENDER LENGTH (ft) | TOTAL AVAILABLE CONDENSATE (gal/hr) | CONDENSATE (gal/hr) | STEAM lb/hr |
|---|---|---|---|---|---|---|---|
| .02307 | 20 | 0.6 | 379.2 | 10 | 114,588 | 88,840 | 205,983 |
| .02307 | 20 | 1 | 466 | 10 | 142,271 | 104,683 | 300,704 |
| .1217 | 50 | 0.6 | 205.6 | 20 | 102,165 | 90,620 | 92,357 |
| .1217 | 50 | 1 | 269.3 | 20 | 143,962 | 122,310 | 173,215 |

Figure 4:
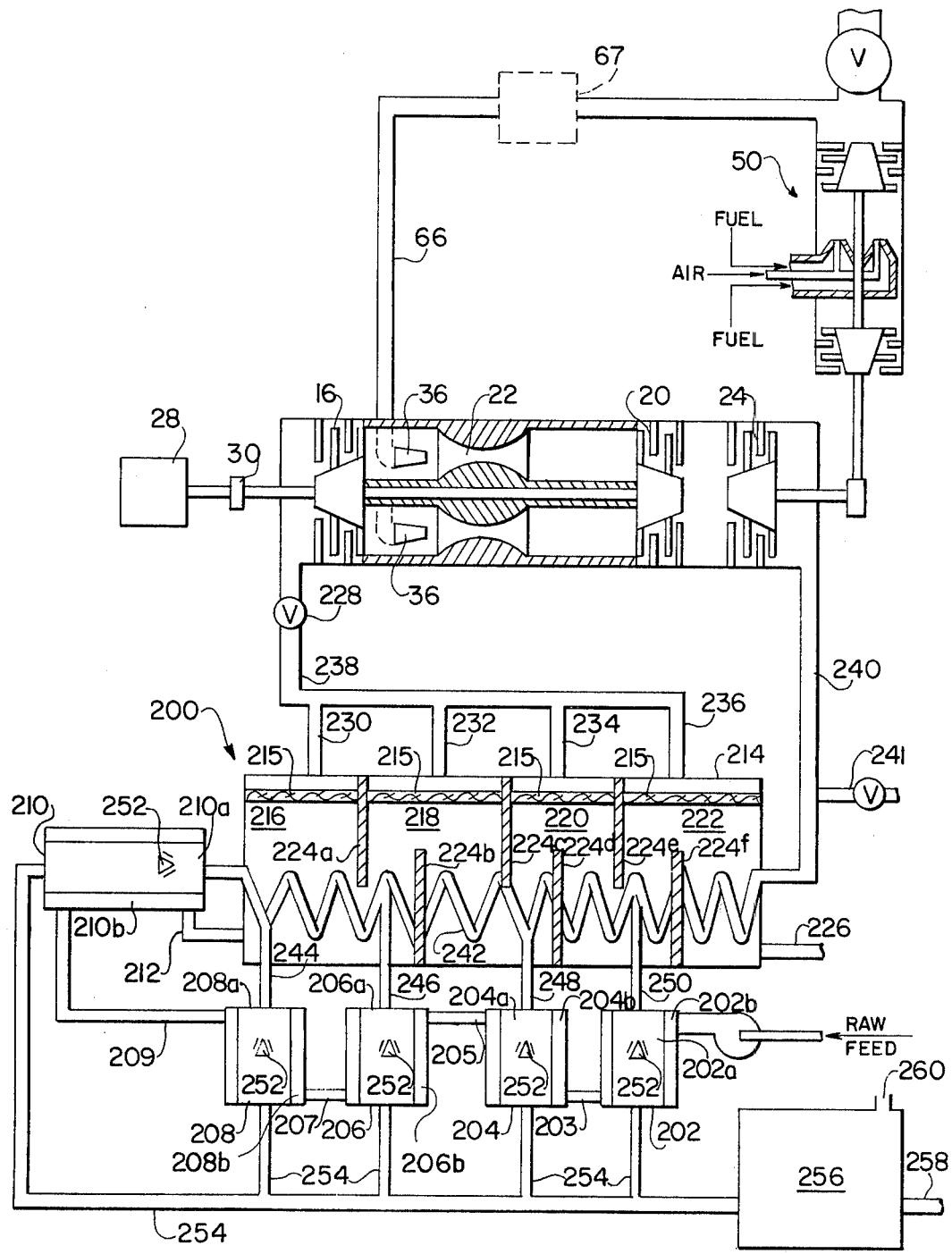
FIG. 4 illustrates schematically a multi-stage embodiment of the present invention, particularly suited for vacuum distillation-vapor compression treatment of waste water.

A multi-stage embodiment of the present invention, embodying a vacuum distillation-vacuum compression system and including an independently operated compressor, is illustrated in FIG. 4. Such a system, as is well known in the art, has the advantage that, due to the multiple distillation stages, it can be constructed using equipment which is significantly smaller than would be required with a single stage system. In addition, a multi-stage system is substantially more flexible in usage than is a single stage system and, by appropriate location of valves, one or more of the stages can be shut down during slack times, thereby producing a smaller quantity of distillate and permitting the cleaning and/or repair of stages which are not then in use. Multi-stage units are conventionally employed in flash distillation plants which usually require large bodies of cooling water, such as sea water, for efficient operation. The employment, as shown in FIG. 4, of a multi-stage system in a vacuum distillation embodiment has the advantage this it requires no large bodies of cooling water and can, accordingly, be located many miles from large bodies of water. Operating conditions for the multi-stage embodiment are substantially the same as for the single stage embodiment with acceptable tempratures in the boiler ($T_1$) as low as about 0° C corresponding to a pressure ($P_1$) of about 0.006 atmospheres and as high a temperature as is consistent with avoiding scaling in the boiler, where appropriate, while at the same time maintaining an effective temperature difference ($\Delta T = T_5 - T_1$) between the vapor exiting the independent compressor and the condensing temperature ($T_1$) in the boiler such that the system can effectively treat large volumes of impure feed liquid. Although the precise temperature and pressure will vary from stage to stage by small amounts, as a general matter, the pressure and temperature is maintained substantially the same in all evaporation stages.

In the system designated by the numeral 200 depicted in FIG. 4, the impure liquid feed enters the shell side 202b of the heat exchanger-condenser unit 202 where it is heated by passage of partially condensed vapor through the condenser side 202a. The heated feed exits heat exchanger-condenser unit 202 via line 203 and enters the shell side 204b of another heat exchanger-condenser unit 204 where it is further heated by passage through the condenser side 204a of additional partially condensed vapor. In a similar manner, the feed liquid is successively heated by passage through the shell sides of heat exchanger-condenser units 206, 208 and 210. In each of these units heat is transferred to the feed liquid from partially condensed vapor passing through the condenser side 204a, 206a, 208a and 210a of the units and through lines 205, 207 and 209 interconnecting the shell sides of the successive heat exchanger-condenser units. Finally, the heated feed liquid exits the shell side 210b of heat exchanger-condenser 210 through feed line 212 and enters multi-stage vaccum distillation boiler chamber 214 wherein it is heated to boiling in each of the stages 216, 218, 220 and 222 of the multi-stage chamber. In chamber 214 the feed flows over and under a plurality of baffles 224a, 224b, 224c, 224d, 224e and 224f through all of the evaporation spaces until unevaporated concentrated liquid feed containing the great bulk of impurities in the feed exits the multi-stage chamber 214 via line 226. The pressure within the evaporation space of multi-stage evaporation chamber 214 is maintained substantially at $P_1$ and $T_1$ by pressure regulating valve 228, which may be a spring or servo-controlled valve. The vapor produced in chamber 214 at $P_1$, $T_1$ exits the stages 216, 218, 220 and 222 through moisture separators 215 and vapor exit lines 230, 232, 234 and 236 respectively. The vapor recombines in vapor discharge line 238 which directs the vapor through pressure regulating valve 228 and into and through compressor 16, mixing chamber 22, turbine 20 and independent compressor 24, all as described in connection with FIG. 1. The vapors are adiabatically compressed by compressor 16 to $P_2$, $T_2$, admixed and isobarically heated with hot, combustion gases emitting from injectors 36 in mixing chamber 22 to $P_3$, $T_3$, adiabatically expanded through turbine motor 20 to $P_4$, $T_4$ and re-compressed adiabatically to $P_5$, $T_5$ in independent compressor 24, operated by motive power system 50, before entering multistage evaporation chamber condenser section coils 242 via return line 240. In the condenser section, the vapor is at least partially condensed, transferring its latent heat to the heated feed liquid entering the chamber 214 via feed line 212. Excess steam may be diverted through line 241 to keep the system in thermal balance. The almost completely condensed vapor is tapped from condenser coil 242 in each of the stages 216, 218, 220 and 222 via condensate return lines 244, 246, 248 and 250 and led to the condenser sides 202a, 204a, 206a, 208a, 210a of heat exchanger-condenser units 202, 204, 206, 208 and 210 wherein the vapors completely condense giving up their remaining heat to the feed liquid passing through the shell sides of these units. Flow is controlled through the condenser sides of the heat exchanger-condenser units, which are preferably jet condenser units having pressure and expansion chambers therein, by servo or spring controlled pressure valves 252 in each of the condenser units, which valves serve to maintain the pressure on the condenser side and to assure that all vapors of condensed therein. The cooled condensate exits the condenser side of units 202, 204, 206, 208 and 210 via line 254 and its respective branches and is directed to storage tank 256 from which pure condensate may be drawn for general usage through line 258. Non-condensible gases exit via vent 260.

Inasmuch as the liquid feed flows serially through the various stages 216, 218, 220 and 222 of the evaporation chamber 214, the feed liquid becomes more and more concentrated as it flows from feed line 212 toward concentrated liquid discharge line 226, thus increasing the possibility of scaling in evaporation spaces 220 and 222 as compared with spaces 216 and 218. Proper control of the pressure and temperature in the multi-stage chamber 214 via valve 228, however, can avoid scaling. Another means of avoiding this increased likelihood of scaling is by modifying chamber 214 in such a manner that the baffles extend the entire length of the chamber 214, thereby defining enclosed evaporative spaces and by adding feed lines directly from the shell sides of heat exchanger-condenser units 202, 204, 206, 208 and 210 to each evaporate space so that fresh raw feed passes directly into each evaporative space independent of each other evaporative space.

Figure 5:
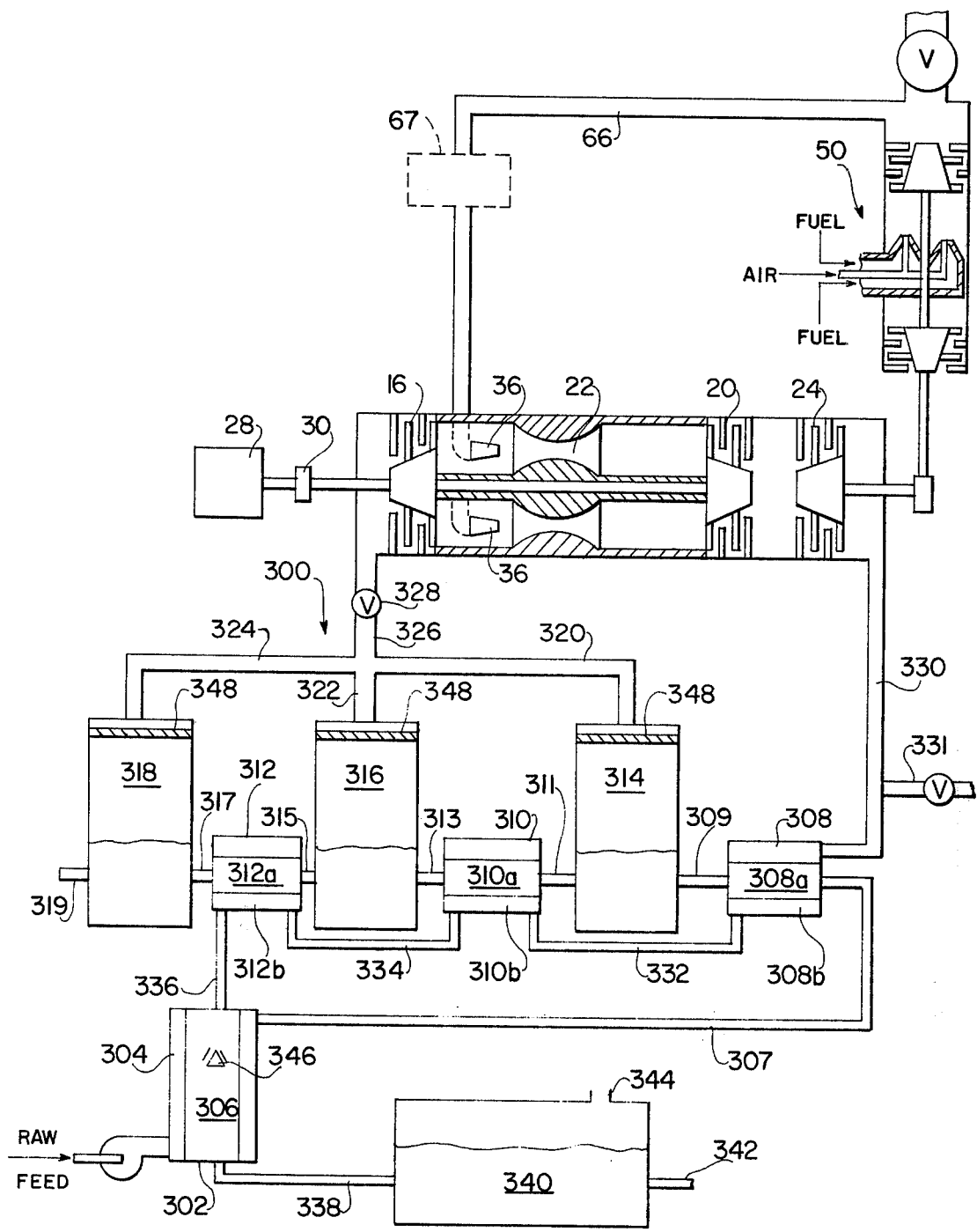
FIG. 5 illustrates schematically a multi-stage embodiment of the present invention, particularly suited for flash distillation-vapor compression of waste water.
Figure 6:
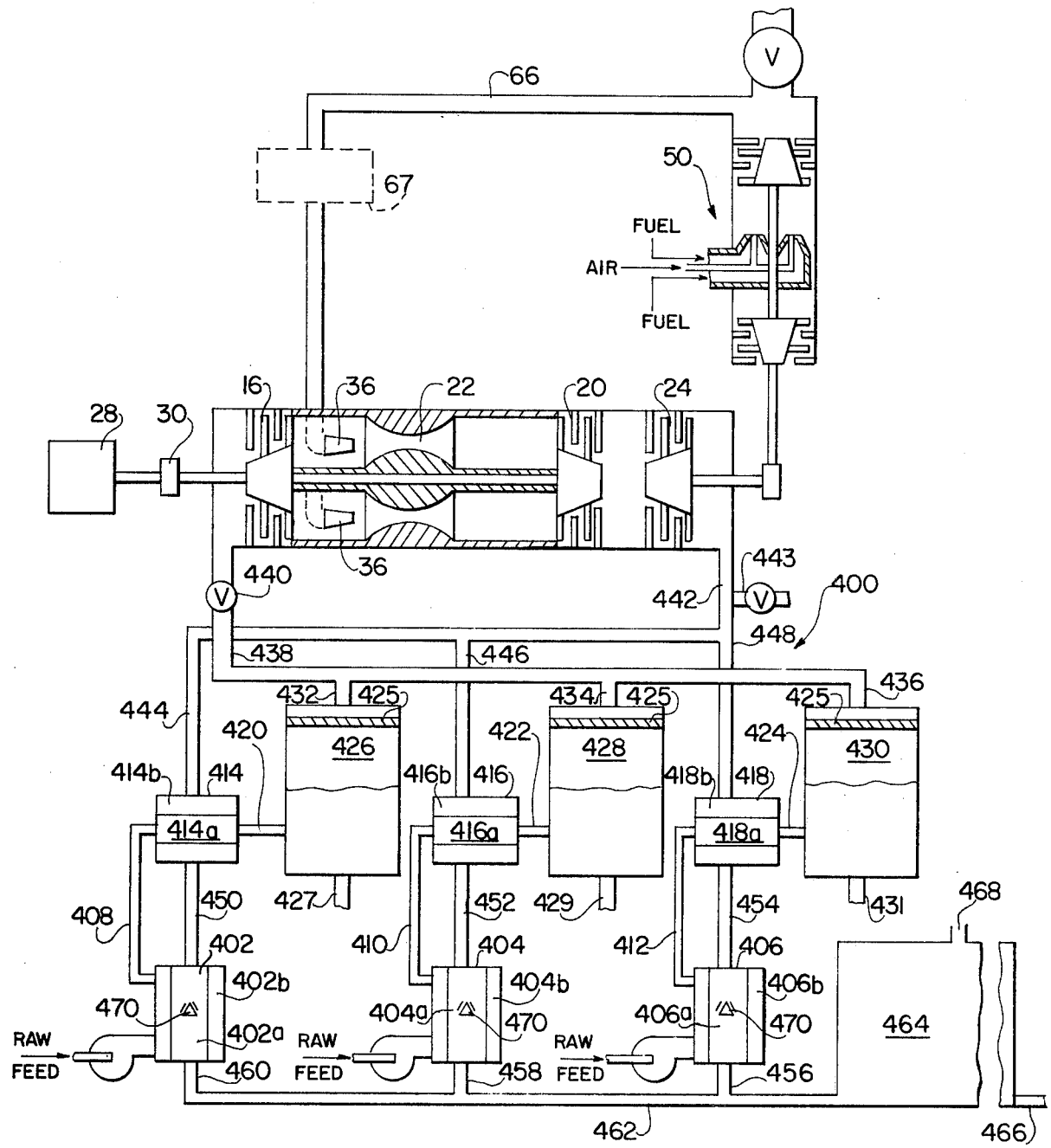
FIG. 6 illustrates schematically another multi-stage flash distillation embodiment of the present invention.

As has been hereinbefore indicated, the instant invention is equally applicable to flash distillation as the evaporative mode for forming the vapor in the system. The embodiments of FIGS. 5 and 6 are generally directed to flash distillation-vapor compression multistage systems. As is well known, in conventional multistage flash distillation systems the flash chambers are interconnected with baffles and weirs to permit the flow of distilland from the first to the last flash chamber and each chamber is operated at a successively lower temperature and pressure than the preceeding chamber. As a consequence, each of the lower temperature and pressure stages are significantly less efficient than the first flash distillation stage, which is one disadvantage of flash distillation systems. For example, U.S. Pat. No. 2,759,882 discloses a seven stage combined flash distillation and vapor compression evaporator wherein it is disclosed that the 8.2 lbs of distilled water produced by the seven stages, the first stage produces 4.2 lbs. and the remaining six stages together only produce an additional four pounds, with the average efficiency of the last six stages about 1/6th the efficiency of the first stage. This disadvantage of multi-stage flash distillation systems is overcome in accordance with the present invention by maintaining the temperature and pressure at the same level in each of the flash chamber stages so that a high volume flow of distillate can be achieved. It is noteworthy that a characteristic of flash distillation systems is that the boilers do not contain heating means and, therefore, scaling of the heating means is not generally a problem. Of course, localized scaling is possible due to localized hot spots. However, this can generally be eliminated by maintaining the flow of feed liquid therein reasonably rapid so that heat is absorbed and dissipated as fast as it is formed with the result that hot spots are substantially eliminated.

Turning now to the embodiment of the invention shown in FIG. 5, the numeral 300 designates generally a flash distillation system into which impure liquid feed is fed and purified condensate is removed in an economical fashion. The raw liquid feed enters the shell side 304 of the heat exchanger-condenser unit 302, which is preferably a heat exchanger-jet condenser unit, in which the liquid feed is heated by the passage of partially condensed vapor through the condenser side 306 of the unit. The heated feed in liquid form exits the shell side 304 through feed line 307 and is passed to the tube side 308a of heat exchanger 308 where it is heated by hot vapor condensing in the shell side 308b. The heated feed passes through line 309 directly into flash chamber 314 where it flashes under the reduced pressure $P_1$ into the evaporative space about the liquid and flows as a vapor though moisture separator 319 and line 320, combined vapor line 326, and valve 328 to turbine compressor 16. Valve 328 is a pressure control valve which regulates the pressure at $P_1$ within each of the flash chambers 314, 316 and 318. The feed liquid which does not flash in chamber 314 exits the chamber through line 311 and enters the tube side 310a of heat exchanger 310 wherein it is heated by the flow of condensing vapor in the shell side 310a, which condensing vapor entered the shell side of heat exchanger 310 through line 332 from heat exchanger 308. The heated feed exits heat exchanger 310 through line 313, flashes in flash chamber 316 under reduced pressure ($P_1$) and flows as a vapor through moisture separator 348 and line 322 and combined vapor line 326 to the turbine compressor 16. In a similar manner, the unevaporated heated feed passes from flash chamber 316 through line 315 into the tube side 312a of heat exchanger 312 wherein it is further heated by vapor from heat exchanger 310 through line 334 condensing in the shell side 312b. The feed continues through line 317 into flash chamber 318 where it is flashed at pressure $P_1$ into vapor, passed through moisture separator 348 and led by vapor line 324 into combined vapor line 326 and then to turbine compressor 16. Any unflashed liquid feed exits the system as concentrated waste through line 319. The combined evaporated vapors in line 326 passing valve 328 at pressure and temperature $P_1$, $T_1$ are adiabatically compressed by compressor 16 to $P_2$, $T_2$, admixed and isobarically heated with hot, clean combustion gases emitting from injectors 36 in mixing chamber 22 to $P_3$, $T_3$, adiabatically expanded through turbine motor 20 to $P_4$, $T_4$, and recompressed adiabatically in independent compressor 24 operated by motive power system 50 to $P_5$, $T_5$, all as described in connection with the embodiment of FIG. 1. The recompressed vapor at $P_5$, $T_5$ returns to the shell sides of heat exchangers 308, 310 and 312 via return line 330 and is directed from the last heat exchanger shell 312b through line 336 into the condenser side of 306 of heat exchanger-condenser unit 302. Controlling flow through the condenser side 306 is spring or servo operated pressure valve 346 which serves to maintain the pressure on condenser side 306 and to assure that all vapors are condensed therein. Line 338 carries condensed vapor into storage container 340 from which pure condensate may be drawn for general usage through line 342. Non-condensible gases exit via vent 344. Excess steam may be diverted from return line 330 through line 331 to keep the system in thermal balance.

A preferred form of flash distillation-vapor compression system is illustrated in FIG. 6. In the system of FIG. 6, designated generally as 400, the raw liquid feed separately enters the shells 402b, 404b, 406b of heat exchanger condenser units 402, 404 and 406, which are preferably heat exchanger-jet condenser units. In the heat exchanger-condenser units, the raw feed is heated by the flow of partially condensed vapor through the condenser side 402a, 404a and 406a of the units. The partially heated feed passed out of the units 402, 404 and 406 through feed lines 408, 410 and 412, respectively, into the tube sides of heat exchanger units 414, 416 and 418. In these heat exchanger units, the feed is further heated by the condensing vapor entering the shell sides 414b, 416b and 418b of the heat exchanger units through vapor return lines 444, 446 and 448. The heated feed from each of the heat exchangers enters its respective flash chamber 426, 428 and 430 through feed lines 420, 422 and 424, respectively. The heated feed flashes under the reduced pressure $P_1$ at a temperature $T_1$ in each of the flash chambers. Any unflashed concentrated waste is removed from the flash chambers through lines 427, 429 and 431, respectively. The flashing vapor passes moisture separators 425 and is collected in vapor lines 432, 434 and 436 and combined vapor line 438 and is passed through pressure control valve 440 into turbine compressor 16. Valve 440 regulates the pressure in each of the flash chambers 426, 428 and 430 to $P_1$. The vapors passing valve 440 are adiabatically compressed by compressor 16 to $P_2$, $T_2$, admixed and isobarically heated with hot, clean combustion gases emitting from injectors 36 in mixing chamber 22 to $P_3$, $T_3$, adiabatically expanded through turbine motor 20 to $P_4$, $T_4$, and re-compressed adiabatically to $P_5$, $T_5$ in independent compressor 24, operative by motive power system 50, all as described in connection with the embodiment of FIG. 1. The compressed vapors at $P_5$, $T_5$ return to heat exchangers 414, 416 and 418 through combined vapor return line 442 and then through individual vapor return lines 444, 446 and 448 to the shell sides 414b, 416b, 418b of the heat exchangers where the hot returning vapors at least partially condense, transferring their latent heat to the feed liquid on the tube sides of the respective heat exchangers. The almost completely condensed vapor exits the heat exchangers through lines 450, 452 and 454 and flows into the condenser side 402a, 404a and 406a of units 402, 404 and 406 wherein further condensation takes place and the heat thereby given up is transferred to the entering raw liquid feed. Controlling flow through the condenser sides 402a, 404a and 406a are spring or servo-operated pressure valves 470 which serve to maintain the pressure on the condenser sides of units 402, 404 and 406 and to assure that all vapors are condensed therein. The condensate is carried through condensate return lines 456, 458 and 460 and combined condensate return line 462 into storage container 464 from which pure condensate may be drawn for general usage though line 466. Non-condensible gases exit via vent 468. Excess steam may be diverted from return line 442 through line 443 to keep the system in thermal balance.

The parallel-parallel embodiment of flash distillation-vapor compression system shown in FIG. 6 is probably the most efficient type because concentration of waste can be individually adjusted from each flash chamber by adjusting the feed flow into each chamber. In addition, different types of raw feed having a common carrier solvent, e.g., water, can be introduced into each chamber and valuable by-products can be separated from the common solvent of the feeds in each chamber and separately recovered.

The invention has thus far been described in its simplest forms and has, in each embodiment, utilized but a single turbine compressor operated by a single turbine motor. However, the configuration of the turbine compressor 16/turbine motor 20 need not be as simplistic as shown in FIGS. 1 and 3–6. Rather, considerable flexibility can be introduced into the sytem if the compressor, the turbine, the compressor-turbine combination or the compressor-mixing chamber-turbine combination is configured to meet the requirements and demands of the particular system. For illustrations of particular arrangements which are useful and are all operable in the systems as shown in FIGS. 1 and 3–6, attention is invited to FIGS. 7–14 and the description thereof which follows.

Figure 7:
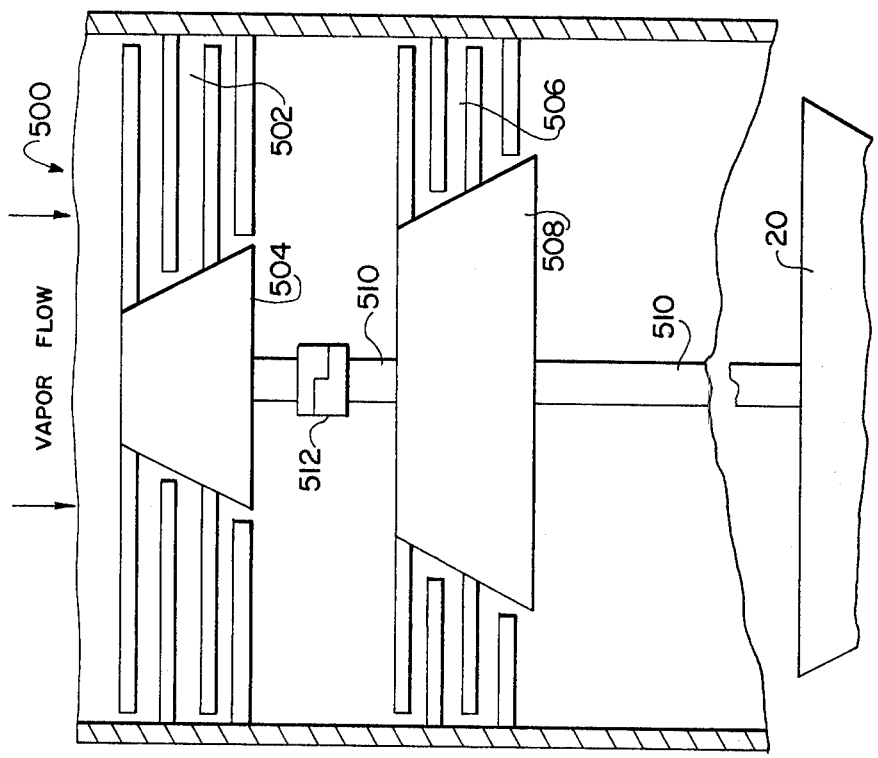
FIG. 7 illustrates schematically a clutched compressor unit which can be operated by a turbine motor as an optional turbine-compressor unit useful in the many embodiments of the present invention.

Referring first to FIG. 7, there is illustrated schematically a clutched compressor unit designated by the numeral 500, which unit may be used in lieu of turbine compressor 16 in FIGS. 1 or 3–6. The clutched compressor unit 500 is operated by a turbine 20 (partially shown) and includes a first compressor 502 having a compressor spindle 504 and a second compressor 506 having a compressor spindle 508 which is substantially larger than is spindle 504. Spindles 504 and 508 are linked through shaft 510 and clutch 512. Clutch 512 can be a variable clutch which causes the smaller spindle to rotate at a different velocity than the larger spindle, i.e., clutch 512 may be a variable gear box generally similar to an automobile transmission, which permits the compression ratio to be varied at will. Such a system is valuable as an aid in adjusting system operating variables depending upon the density of the vapor and the need to increase or decrease the flow rate through the system.

Figure 9:
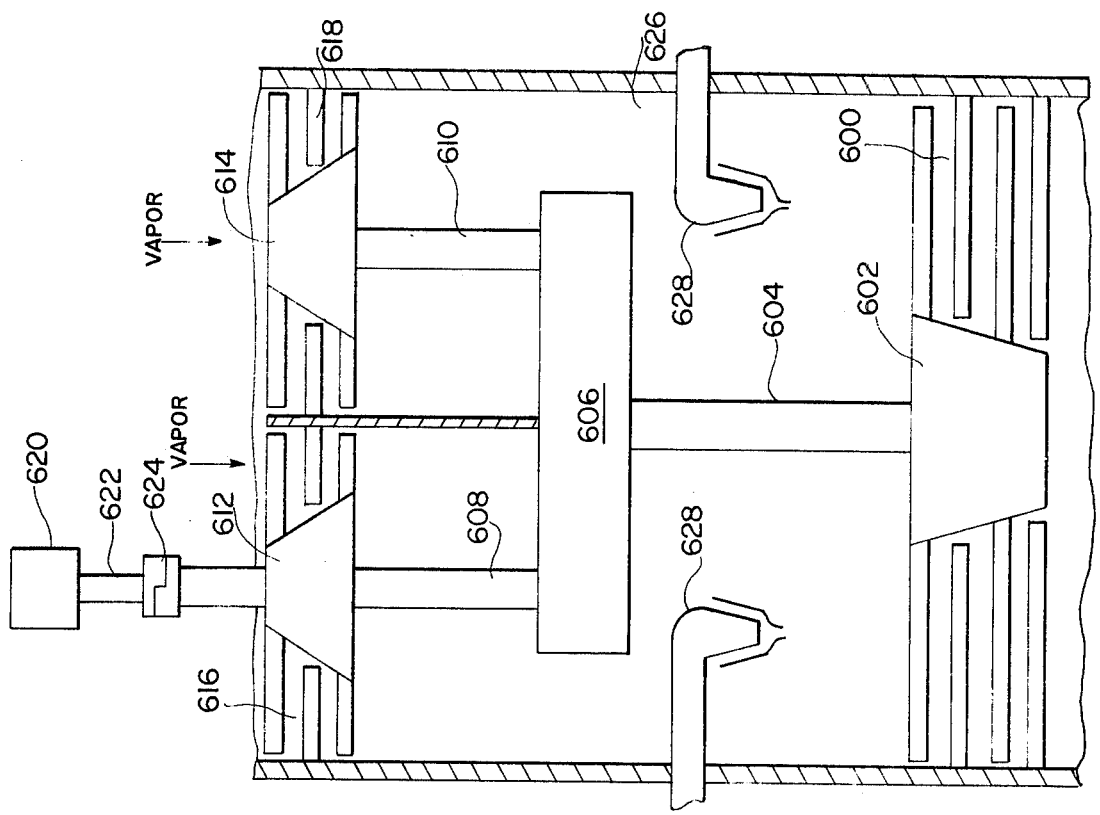
FIG. 9 illustrates schematically a single turbine motor operating two turbine compressors as an optional turbine-compressor unit useful in the many embodiments of the present invention.
Figure 8:
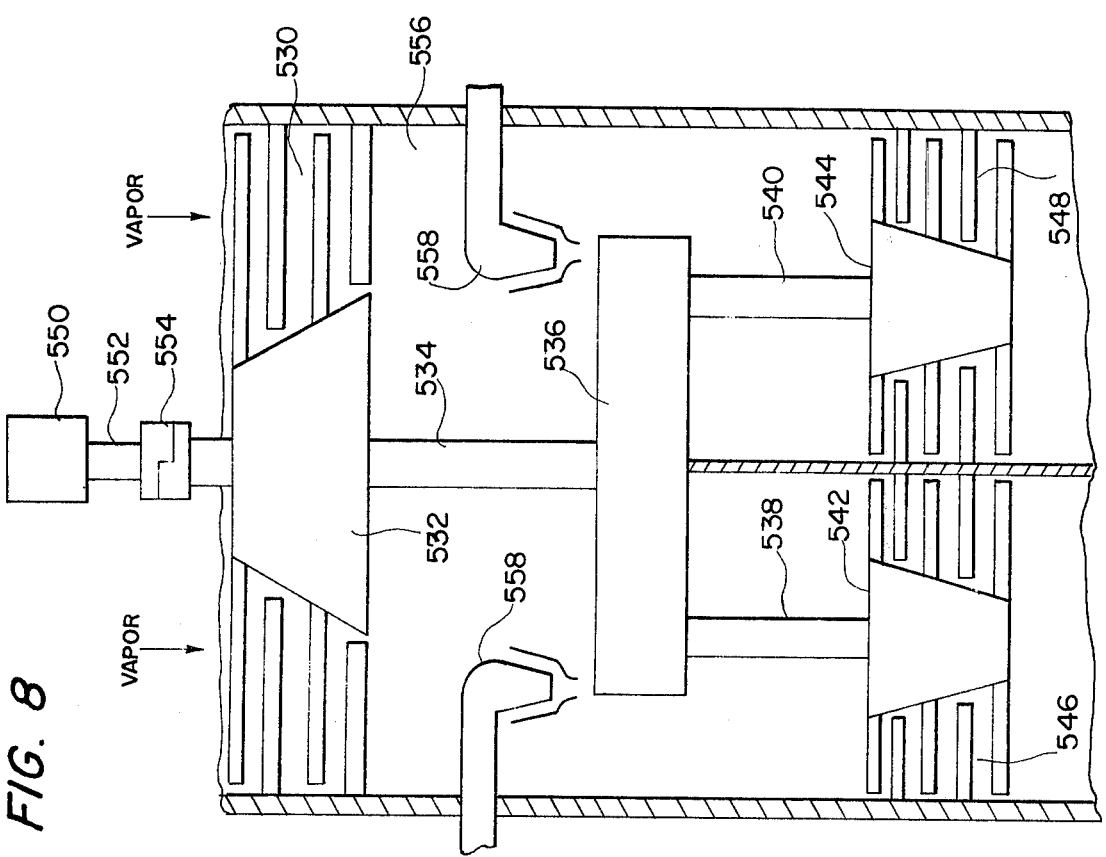
FIG. 8 illustrates schematically two turbine motors operating a single turbine compressor as an optional turbine-compressor unit useful in the many embodiments of the present invention.

FIG. 8 illustrates two turbine motors operating a single turbine compressor through a clutch and gear box. Compressor 530 has its spindle 532 linked through shaft 534 to clutch and gear box or transmission gear box 536. Shafts 538 and 540 link gear box 536 with turbine spindles 542 and 544 of turbines 546 and 548. In operation, starting motor 550 acting through shaft extension 552 and clutch 554 starts spindle 532 of compressor 530 rotating. Power is transmitted through shaft 534 to gear box 536 and, through shafts 538 and 540, spindles 542 and 544 of turbines 546 and 548 are also caused to rotate. Hot, clean combustion gases are mixed with the vapor flowing through space 556 as the gases are emitted into space 556 through injectors 558. The combined vapor flow and combustion gases transmit rotary power to turbines 546 and 548 and through transmission gear box 536 to compressor 530. A particular advantage of this configuration is that it is more flexible than two separate compressor-turbine combinations and, at the same time, more economical. FIG. 9 illustrates a single turbine motor 600 having a spindle 602 linked through shaft 604 to gear box 606 which gear box is directly linked through shafts 608 and 610 to the spindles 612 and 614 to compressors 616 and 618. In operation, starting motor 620 operating through shaft extension 622 and clutch 624 starts spindle 612 of compressor 616 turning and, in turn, causes compressor 614 and turbine 600 to also rotate. Hot, clean combustion gases are mixed with the vapor flowing through space 626 as the gases emit from injectors 628. The combined vapor flow and hot combustion gas flow motivates turbine 600 which, through gear box 606, can operate either or both of the compresors 616 and 618. This configuration has advantages similar to those of the configuration illustrate in FIG. 8.

Figure 11:
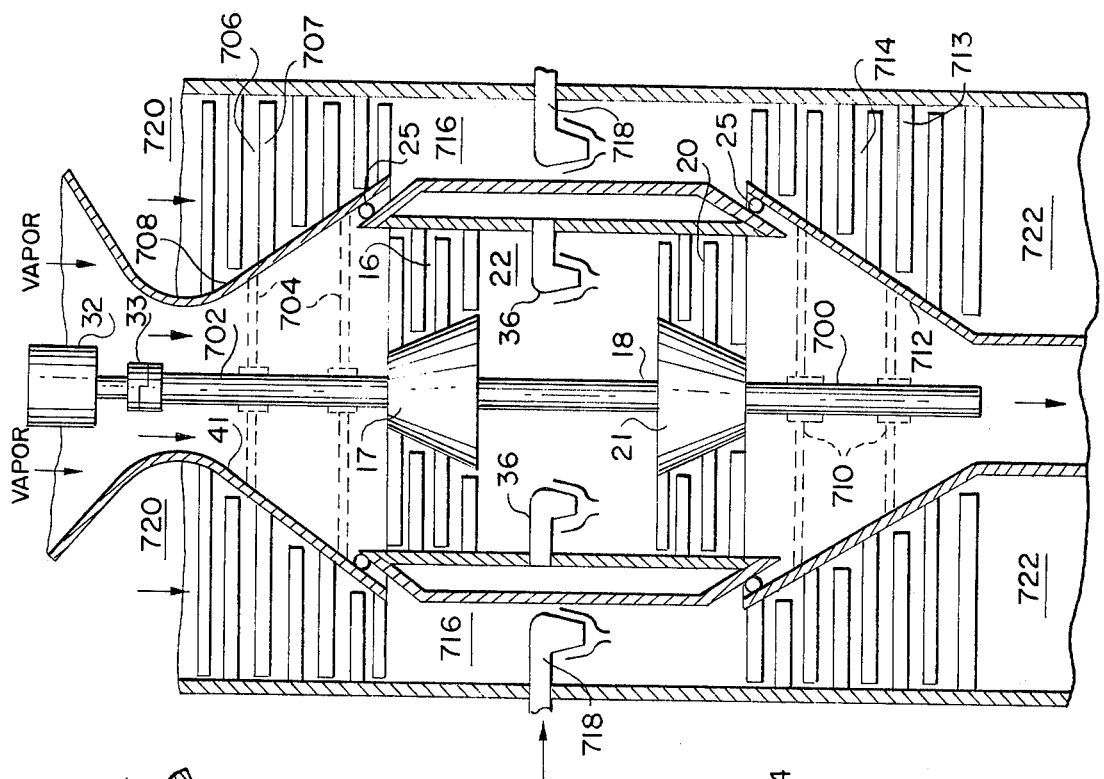
FIG. 11 illustrates schematically concentric compressor-turbine combinations, one of which combinations can be powered by dirty, hot gases, as an optional turbine-compressor unit useful in the many embodiments of the present invention.
Figure 10:
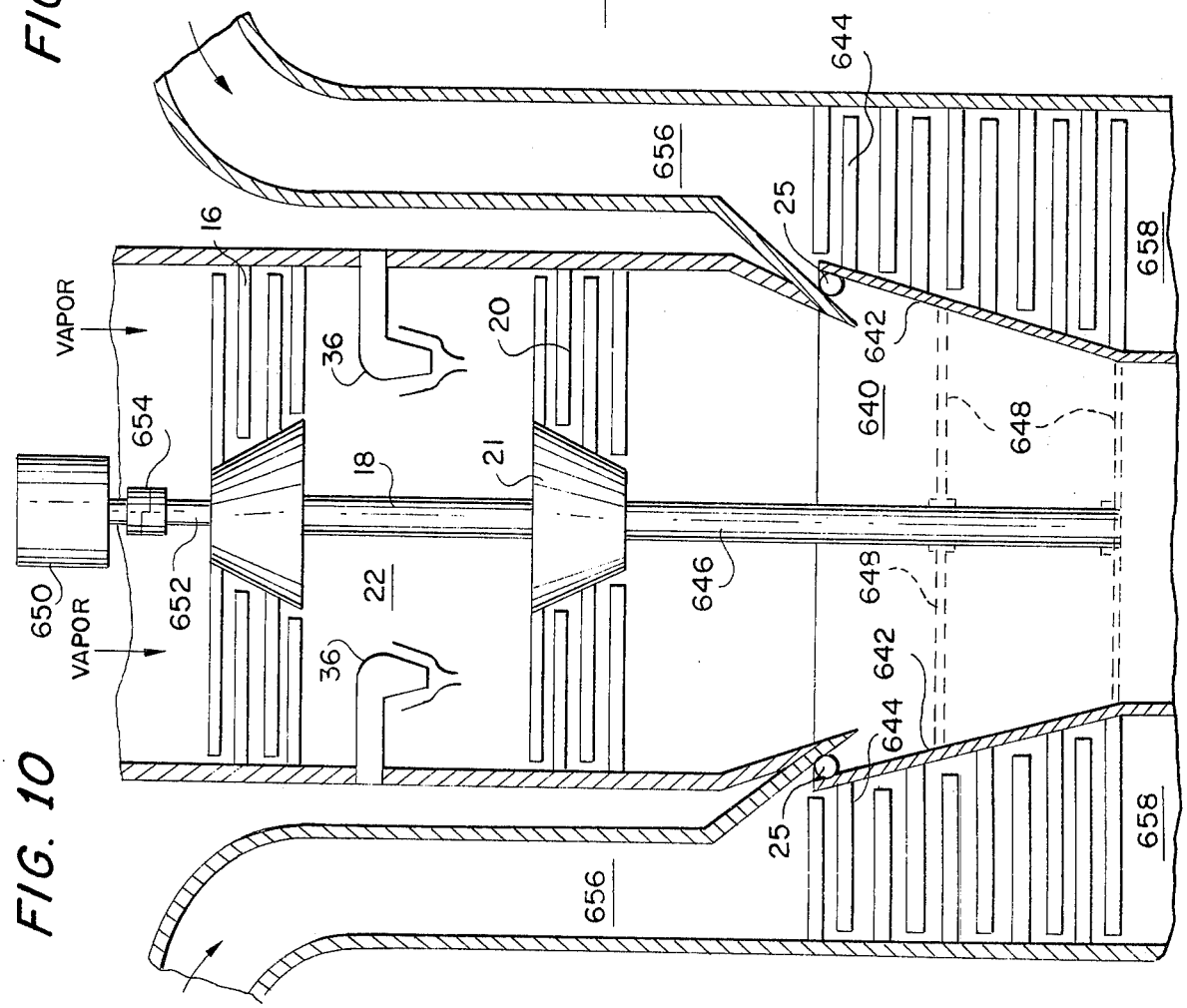
FIG. 10 illustrates schematically two turbines, one of which can be powered by dirty, hot gases, operating a turbine compressor as an optional turbine-compressor unit useful in the many embodiments of the present invention.

FIGS. 10 and 11 illustrate embodiments of the compressor-turbine combination which permit the use of hot, dirty combustion gases in addition to hot, clean combustion gases to provide additional motive power for driving the turbine and, in turn, through the linked shaft, for driving the vapor compressor as well. In these embodiments, the hot, dirty combustion gases do not actually mix with the vapor in the system, and, therefore, the purity of the condensate produced by the system is not compromised by use of dirty combustion gases for additional motive power. Referring first to FIG. 10, there is shown a configuration which includes the conventional compressor-turbine combination taught in FIGS. 1 and 3-6, which configuration includes a mixing chamber for mixing hot, clean combustion gases with the vapor flowing through the turbine and the compressor. In addition, the unit illustrated in FIG. 10 includes a hot, dirty combustion gas driven turbine which increases the shaft power available for driving the compressor. The unit of FIG. 10 includes compressor 16 linked through shaft 18 to turbine 20 and vapor-combustion gas mixing chamber 22 defining the space between the turbine and the compressor. Injectors 36 emit hot, clean combustion gases for mixing with the vapor with the result that the combined flow of the vapor and the combustion gases operate turbine 20, which, through shaft 18, drives compressor 16. The system also includes a dirty combustion gas operated turbine 640 which consists essentially of a hollow spindle 642 and blades 644 attached to the outside surface of the hollow spindle. The spindle 642 is drivingly linked to shaft 646 through supports 648. Shaft 646 is operatively linked with the spindle 21 of turbine 20, which spindle is joined through shaft 18 to the spindle 17 of compressor 16. In operation, the system is energized by starting motor 650 acting through shaft extension 652 and clutch 654. Dirty combustion gas turbine 640 is disposed with its blades arranged in flow space 656 which is annularly arranged with respect to vapor and clean combustion gas flow space 22 and which is separated therefrom by a solid partition, and sealing ring 25. In this manner, hot, dirty combustion gases are directed through space 656 to act on turbine 644 which, through spindle 642 and supports 648, rotate shaft 646. The expanded dirty combustion gases exhaust from the turbine 640 into space 658 in such a manner that they never combine or mix with the vapor or the clean combustion gases.

FIG. 11 illustrates a completely concentric unit wherein one compressor-mixing chamber-turbine combination surrounds and is directly linked to another compressor-mixing chamber-turbine combination. In this configuration, the outer compressor-mixing chamber-turbine combination supplies rotary power to the inner system to improve the performance of the inner system. The inner system, which is the compressor-mixing-chamber-turbine combination disclosed in FIGS. 1 and 3-6, includes compressor 16 linked through shaft 18 to turbine motor 20 and mixing chamber 22 between the compressor and turbine in which clean combustion gases emitting from injectors 36 admix with the vapor flowing through chamber 22 to operate turbine 20. Extending from spindle 17 of compressor 16 and from spindle 21 of turbine 20 are shaft members 700 and 702 respectively. Connected to shaft 702 are supports 704 which rotate compressor 706 through its hollow spindle 708. Connected to shaft 700 are supports 710 through which shaft 700 is rotated by the hollow spindle 712 of turbine 714. The blades 707 of compressor 706 and 713 of turbine 714 are arranged in an annular space surrounding the compressor-turbine unit 16, 20. The annular space is separted from the vapor clean combustion gas flow space by a solid partition, and sealing ring 25. Turbine 714 is operated by combustion gases, which may be dirty gases, emitted into space 716 through injectors 718. In space 716 the combination gases may be mixed with air drawn therein from space 720 upstream of compressor 706 which air is drawn into the system and compressed by compressor 706. The air admixed with the hot combustion gases exhausts through space 722 and never comes in contact with the vapor and clean combustion gases which move through space 22. As the dirty combustion gases and air drawn in through space 716 pass through turbine 714, they do work on turbine blades 713 causing turbine 714 to rotate and to transmit power through supports 710 to shaft 700, which power is utilized by coaxial compressor 16 in doing work on the vapors which are drawn into space 22. In an alternative form of this embodiment, space 716 may operate as a combustion chamber and injectors 718 used to inject fuel into the space for combustion with the air drawn in from space 720.

Numerous modifications can be made to the configuration illustrated in FIG. 11 to alter it and/or improve it for particular usages. Thus, supports 704 or 710 could be formed into air foil shaped fans to assist in the movement of large masses of vapor. Still another modification involves clutching and gearing the outer compressor-turbine combination to the inner compressor-turbine combination in order that the rate of rotation of the latter could be varied with respect to the former. Another useful modification is the addition of further compressor-turbine combinations in concentric relationship to the two shown in FIG. 11, all with the purpose of increasing the motive power available for compression in compressor 16 and of utilizing available energy sources, such as dirty combustion gases, in as economical a manner as is possible. The fundamental advantage of the configuration of FIG. 11 is that it enables utilization of as many different combination gas sources as may be available at the system location for supplying economical power to compress the vapors flowing into space 22.

Figure 13:
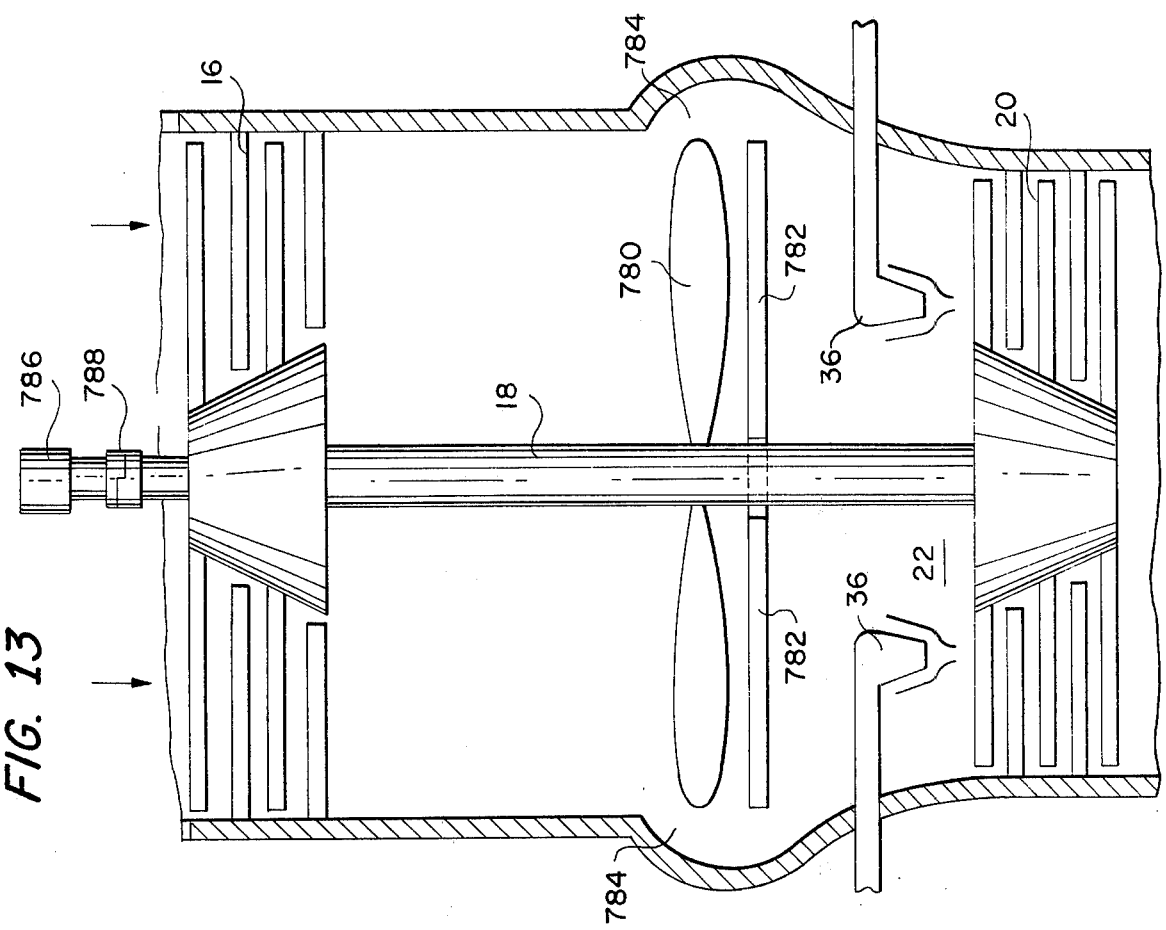
FIG. 13 illustrates schematically a centrifugal compressor and a turbine compressor operated by a single turbine motor as an optional turbine-compressor unit useful in the many embodiments of the present invention.
Figure 12:
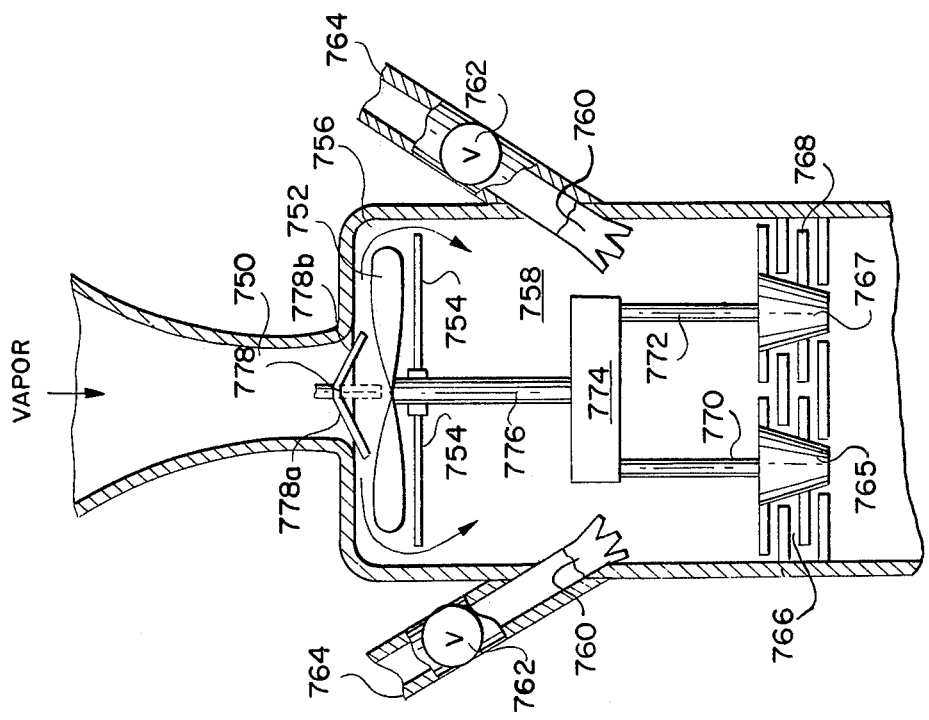
FIG. 12 illustrates schematically a centrifugal compressor operated by two turbine motors in tandem as an optional turbine-compressor unit useful in the many embodiments of the present invention.

FIGS. 12 and 13 show still other configurations for the compressor-mixing chamber-turbine unit of FIGS. 1 and 3–6. Specifically, these Figures illustrate the use of centrifugal compressors instead of or in addition to turbine compressors. Centrifugal compressors have the advantage that they readily pass condensed liquid via the large waterways at the tips of the compressors impellers. Referring first to FIG. 12, there is shown an inlet nozzle which leads from the evaporative unit directly to the impeller of a centrifugal compressor. Nozzle 750, which is optionally a venturi nozzle but may be merely an inlet duct, directs the hot vapor to impeller 752 of a centrifugal compressor which includes back plates 754 to prevent the flow of vapor straight through and to assist impeller 752 in directing and concentrating the flow of vapor toward the sides 756 of the chamber off the tips of the impeller. The compressed vapor passing centrifugal impeller 752 flows past back plates 754 and into space 758 where it mixes with hot, clean combustion gases issuing from injectors 760 which are shown in FIG. 12 to be optional multi-nozzle injectors. The flow of combustion gases through injectors 760 is controlled by flow control valves 762 disposed in the arms 764 leading to the injectors. The vapor passing the centrifugal compressor admixed with the combustion gases and together the vapor and gases motivate turbines 766 and 768 disposed in tandem. As spindles 765 and 767 of turbines 766 and 768 are caused to rotate, they in turn rotate shafts 770 and 772 linked through clutch and transmission box 774 to shaft 776. Rotation of shaft 776 operates impeller 752 of the centrifugal compressor. As in the other configurations disclosed herein, the system can be started rotating initially utilizing a starter motor through a clutched system shaft-linked to one of the spindles 765, 767 of the tandem turbines. Optional butterfly valve 778 is shown disposed in the neck of entrance nozzle 750 to control the flow direction of the vapors entering from the boiler. The butterfly valve 778 is preferably arranged in such a manner that arms 778a and 778b can be brought together to fully open nozzle 750 and, in that position, to offer little or no resistance to vapor flow therethrough. FIG. 13 illustrates turbine compressor 16 shaft linked through shaft 18 to turbine motor 20 and clean combustion gas injectors 36 disposed in mixing chamber 22 to emit clean combustion gases for combination with the vapor flowing through compressor 16 to conjointly operate turbine 20. Starting motor 786 and clutch 788 are provided for initial start-up of the system. In this embodiment, however, a centrifugal impeller 780 is operated by shaft 18 in conjunction with back plates 782. As described in connection with FIG. 12, the impeller together with the back plates directs and concentrates the flow of vapor toward the ends of the impeller into spaces designated generally as 784 whereupon the vapors are additionally compressed prior to admixing in space 22 with the clean combustion gases emitted from injectors 36.

Figure 14:
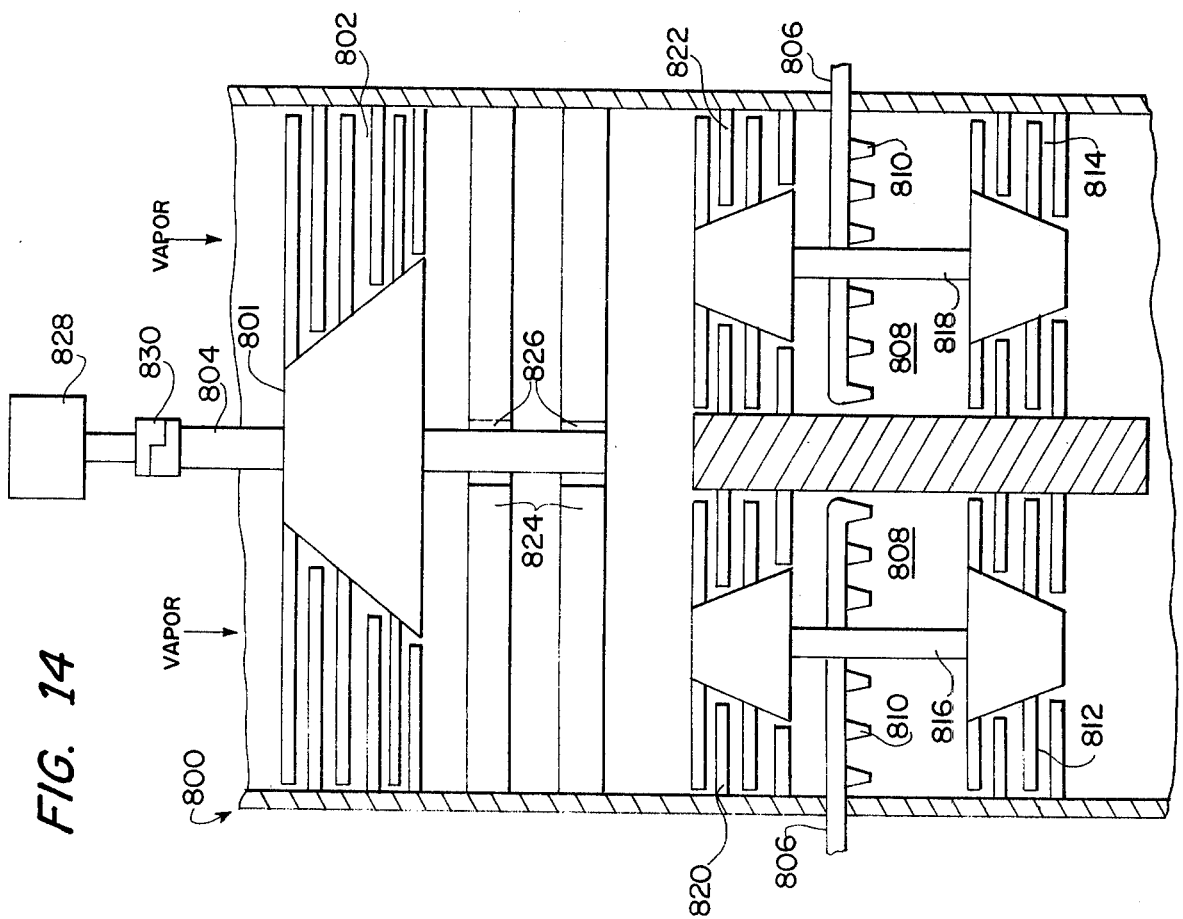
FIG. 14 illustrates schematically an optional free wheeling compressor unit with two turbine driven compressors in tandem, which unit is useful as the turbine-compressor unit in the many embodiments of the present invention.

Yet another useful configuration for the compressor-mixing chamber-turbine unit is illustrated generally at 800 in FIG. 14. The unit shown consists of two compressor turbine combinations in tandem together with a free-wheeling compressor upstream of the tandem combinations. Specifically, free-wheeling compressor 802 is disposed in the path of vapor entering the unit and permitted to rotate at its own rate which is dependent only on the flow rate of vapor therethrough. Starter motor 828 and clutch 830 are shown operating on shaft 804 to which spindle 801 of the free-wheeling compressor is also connected. Hot clean combustion gases enter the system through feed lines 806 and are emitted into mixing chamber 808 of each tandem unit through injectors 810 therein. The hot, clean combustion gases admix with the vapor flowing through chambers 808 and the vapor and gases together operate on turbines 812 and 814. Turbines 812, 814 are linked respectively, through shafts 816, 818 to compressors 820, 822, which compressors are operated by rotation of turbines 812 and 814. As compressor 820 and 822 are rotated, vapor is drawn into the unit past free-wheeling compressor 802 causing the compressor to rotate while supported by supports 824 and bearings 826. The configuration of FIG. 14 has the obvious advantage of affording a larger through-put while utilizing less power due to the presence of the free-wheeling compressor 802. Depending upon the motive power necessary for compression of the system, either or both of turbines 812 and 814 can be used.

In accordance with the foregoing embodiments of the invention, independent compressor 24 has been a necessary feature in order to raise the temperature and pressure of the vapor to $T_5$, $P_5$ and establish a temperature differential $\Delta T = T_5 - T_1$ in the boiler condenser section sufficiently large to accomodate the large flow volumes contemplated by the invention. It is possible, however, to eliminate independent compressor 24 and to replace it with other means for raising the temperature and pressure of the exhaust from turbine motor 20 from $T_4$, $P_4$ to $T_5$, $P_5$. The system 900 illustrated on FIG. 15 accomplishes the same high volume flow purification of impure liquid feed without need for independent compressor 24 and at a more economical operating cost per gallon under most circumstances than the hereinbefore described embodiments. This is accomplished by diverting a portion of the relatively high temperature ($T_2$), relatively high pressure ($P_2$) flow exiting turbine compressor 912 to a point downstream of turbine motor 916, and there injecting the $T_2$, $P_2$ vapor into the flow stream of the $T_4$, $P_4$ vapor whereupon the stream mix to form the $T_5$, $P_5$ vapor stream which condenses in the boiler condenser section.

Figure 15:
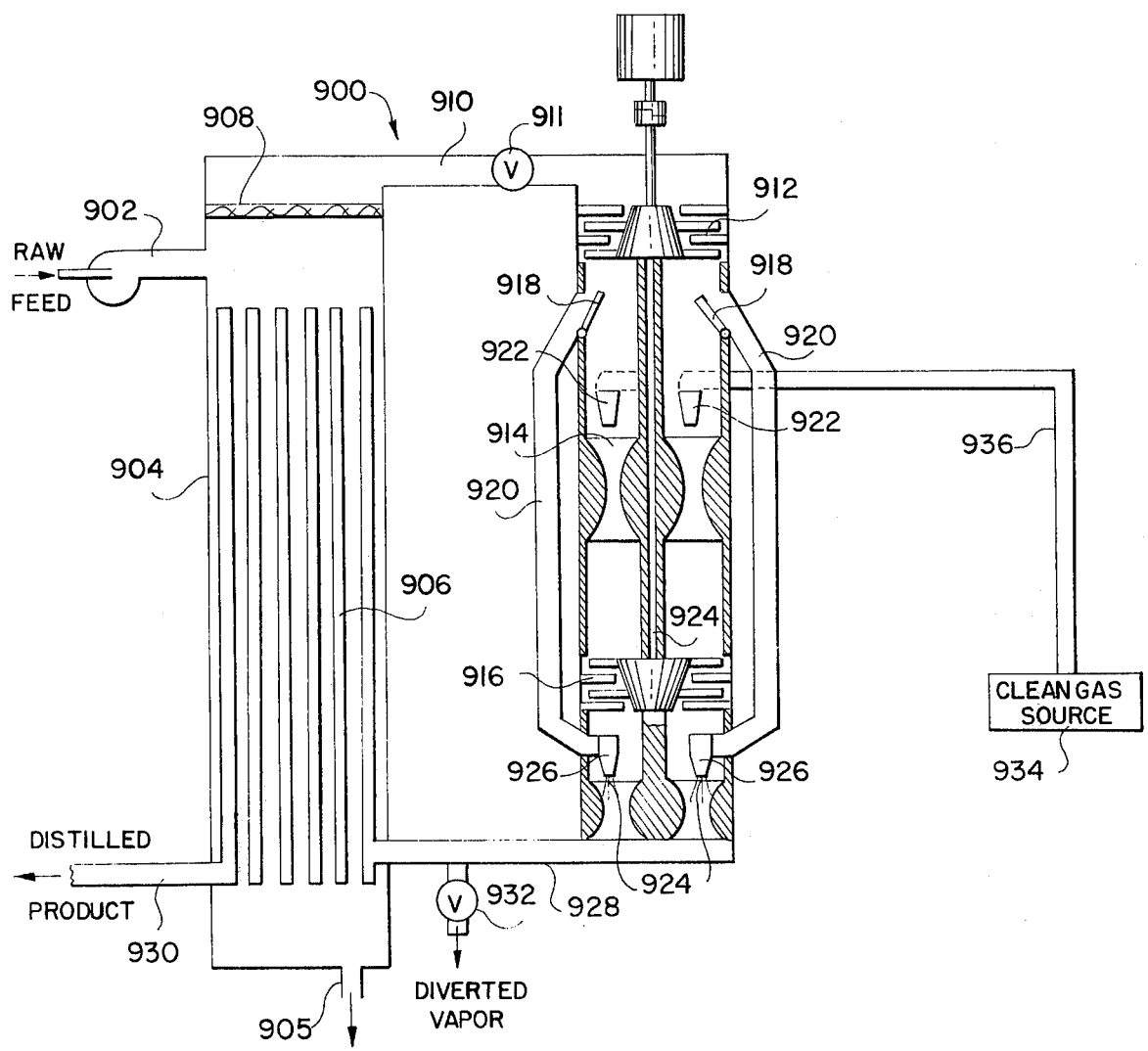
FIG. 15 illustrates schematically an embodiment of the present invention wherein the independent compressor is eliminated and vapor bypass arms and a vapor mixing chamber are substituted therefor.

Referring to FIG. 15, it can be seen that the impure liquid feed enters system 900 through feed duct 902 and is rapidly heated to the boiling temperature, which depends on the vacuum level in the boiler 904, by heat transferred from vapor condensing in hot condenser tubes 906. Unvaporized concentrated feed liquid is removed from boiler 904 through line 905. The vapor produced by boiling at $P_1$, $T_1$ is drawn through moisture separator 908 and into duct 910 leading to turbine compressor 912. The pressure $P_1$ is maintained in boiler 904 by pressure regulating valve 911 disposed in duct 910. The vapor is adiabatically compressed in compressor 912 to $P_2$, $T_2$ and, upon leaving compressor 912, can proceed either through mixing chamber 914 and turbine motor 916 or can be diverted by by-pass control valves 918 into by-pass arms 920. Although two by-pass arms 920 are shown for descriptive convenience, there may, in fact, be only one by-pass arm or there may be multiple by-pass arms. Moreover, the vapor which flows into the by-pass arms may be at the same as or at a higher or lower pressure than the vapor which proceeds through turbine motor 916. Inasmuch as turbine compressors are frequently multi-stage units, and since the extent of compression depends on the number of stages through which the vapor passes, it is a simple matter to direct the flow into the by-pass arms 920 from a different compression stage than the flow which proceeds through turbine 916.

In accordance with this embodiment, it is contemplated that as little as 1% or as much as 100% of the vapor flow exiting compressor 912 may be diverted into by-pass arms 920. Although it is unlikely that in practical operation the amount of vapor by-passing turbine 916 will be at either extreme, as will appear more clearly from the description which follows, the system 900 is operative at the extremes as well as at any point therebetween. The selection of the amount of flow to be diverted depends upon the economics sought from the process, the volume flow rate required and whether reduced operating expenditures take precedence over capital equipment expenditures, or vice-versa.

The vapor which proceeds through compressor 912 is isobarically admixed in mixing chamber 914 with hot, clean gases supplied from source 934 through duct 936 and emitting from injectors 922, and the mixture of vapor and gases operate turbine motor 916 which is linked by shaft 924 to compressor 912. The temperature of the gas is sufficiently greater than the temperature of the vapor to heat the vapor by at least about 2° K to $T_3$ before the vapor does work $W_2$ on turbine 916. Because of the direct shaft link between turbine 916 and compressor 912, the work $W_2$ equals the work $W_1$ done by the compressor on the vapor in adiabatically compressing it. The vapor adiabatically expands through turbine 916 with a resultant pressure and temperature drop to $P_4$, $T_4$.

The vapor which is diverted through by-pass arms 920 is at a temperature and pressure $T_{bp}$, $P_{pb}$ which equals $T_2$, $P_2$ in the case where all vapor is equally compressed in compressor 912. The by-pass vapor is recombined with the vapor passing through the turbine in injector or mixing section 924 wherein the bypass vapor is injected through injectors 926 into the stream of vapor exhausting the turbine. Mixing section 924, like mixing chamber 22 in FIG. 1, can have any suitable configuration for efficient mixing of vapors. The effect of this vapor mixing is to compress and heat the vapor exiting turbine 916 to ambient pressure, since the system downstream of turbine 916 is open to the ambient, and to $T_5$ whereupon the mixed vapor proceeds through vapor return duct 928 to condenser tubes 906 in boiler 904. As was the case in the system of FIG. 1, the vapor condenses in tubes 906 giving up its heat of vaporization of the feed liquid entering the system through feed duct 902. Purified condensate may be removed from the system for general usage through line 930. Excess steam may be diverted through line 932 to keep the system in thermal balance.

It will be appreciated that bypassing the turbine with at least a portion of the vapor together with the mixing action created by injectors 922 upstream of the turbine and injectors 926 downstream of the turbine have the net effect of creating a vacuum at the turbine inlet which materially eases the task of maintaining turbine rotation at a level sufficient that compressor 912 is able to perform a quantity of work $W_1$ in compressing the vapor. Nevertheless, a quantity of work $W_2 = W_1$ must still be done on turbine 916 by the vapor passing therethrough. Since the quantity of vapor passing through the turbine is decreased to the extent of the bypass, not as much vapor is available to run the turbine and the energy content of the bypass vapor must be compensated for by the addition of thermal energy to the gases, which may be combustion gases, injected into mixing chamber 914 through injectors 922. The hot gases, as well as the additional thermal energy, may be furnished in any form, as long as the gases are clean, from any available source. Suitable sources may include hot combustion gas sources, high temperature, high pressure steam sources, and the like.

The embodiment of the invention illustrated in FIG. 15, which may include the numerous boiler, compressor, mixing chamber and turbine variations disclosed in connection with FIGS. 1-14 will be better understood from the following Example which is intended to exemplify, but not limit, the scope of the embodiment.

EXAMPLE VI

Using the general parameters of Example IV, i.e., an initial boiler temperature $T_1$ of 50° C or 323° K from which the initial vapor pressure in the boiler $P_1$ can be determined to be 0.1217 atm., a compression ratio for vapor of 15:1 and a condenser 20 feet long, the system condensate output capability can be determined for various percentages of vapor bypassing the turbine. Keeping in mind that each percent of total vapor flow bypassing the turbine requires an equivalent amount of work to be made up by addition of thermal energy to the combustion gases entering the system through the injectors in the mixing chamber, the total work of compression $W_1$ per pound is calculated from the following equation for adiabatic compression:

$$W_1 = C_v \Delta T \qquad (19)$$

$T_1 = 50°\text{ C }(122°\text{ F}); T_2 = 353.3°\text{ C }(667.9°\text{ F})$
$\Delta T = 545.9°\text{ F}$ $C_v$ is, in fact, not constant with temperature. However, not too great an inaccuracy is introduced by using an average $C_v$ over the temperature range $T_1$ to $T_2$ and calculating the average as:

$$C_v = \tfrac{1}{2}(C_{v122 \; °F} + C_{v668 \; °F}) \qquad (20)$$

Substituting the known values in Equation (20) yields $C_v = 0.3565$ whereupon $W_1$ may be calculated from Equation (19) as $W_1 = 194.6$ BTU/lb.

If all of the vapor flow did work $W_2$ on the turbine, 194.6 BTU/lb would be released from the vapor. However, where a fraction of the vapor bypasses the turbine, that fraction of the 194.6 BTU/lb is not available to run the turbine and must be added into the system with the hot combustion gases. The cost of adding this energy into the system from sources external to the vapor can be calculated from a knowledge that the cost of burning fuel to produce energy is about $2.70/1,000,000 BTU. Assuming that 25% of the flow is bypassing the turbine, then ¼ × 194.6 BTU/lb = 48.7 BTU/lb or 389.6 BTU/gal or 389,600 BTU/1000 gal. is unavailable to operate the turbine. The cost of supplying this energy is calculated as $1.05/1000 gallons using the $2.70/1,000,000 BTU figure. Similar calculations have been made for bypassing 1%, 10%, 50%, 60%, 75%, 90%, 99% and 100% of the vapor flow. The results appear in Table II.

It is also possible to calculate the condensate output capability of the system as a function of the percent of total vapor flow bypassing the turbine. From the 15:1 compression ratio it is readily determined that $P_2 = 15$ $P_1 = 1.8255$ atm. Since the system downstream of turbine 916 is open to ambient, $P_5 = 1$ atm, and assuming that the injection of the bypass vapors into the vapors exiting the turbine results in an adiabatic expansion from $P_{bp}$ or $P_2$ to P, (the pressure in the bypass arm immediately prior to mixing) the attendant temperature drop to T (the temperature in the bypass arm immediately prior to mixing) can be calculated from:

$$T = T_2 (P/P_{bp})^b \tag{21}$$

Substituting $T_2 = 626.3°$ K, $P = 1$ atm, $P_{bp} = 1.8255$ atm, $b = 0.2445$ into Equation (21) yields $T = 540.6°$ K (267.6° C) (513.7° F).

Setting up a heat balance between the vapors in the by-pass stream and the vapors exiting the turbine, it is noted that immediately prior to mixing the bypass vapor is at $T = 513.7°$ F and the turbine exhaust vapor is at $T_4 = 325°$ K (52° C) (125.6° F). Assuming the specific heat ($C_v$) to be constant:

$$C_v (513.7 - T_5) = C_v (T_5 - 125.6) \tag{22}$$

where $T_5$ is the temperature in ° F of the mixed vapor stream entering the condenser section of the boiler.

Assuming that 60% of the total vapor flow bypasses the turbine, Equation (22) becomes:

$$0.6 C_v (513.7 - T_5) = 0.4 C_v (T_5 - 125.6) \tag{23}$$

Solving Equation (23) for $T_5$ yields $T_5$ 32 358.4° F. The effective temperature differential for condensation $\Delta T = T_5 - T_1$ becomes $\Delta T = 358.4 - 236.4°$ F, which $\Delta T$ can be substituted in Equations (12) and (15), as in Example V, to determine the value of R in gallons/hour. Alternatively, the value of 143.962 gallons/hour for a $\Delta T$ of 394° F for Example V(a) can be scaled down to the present $\Delta T$ to determine R.

$R = 143,962 \times 236.4/394.7$ $R = 86,224$ gal/hr for 60% bypass

A similar calculation has been made for other percents of flow bypassing the turbine and the calculated values of R are presented in Table II.

TABLE II

| % BYPASS | R* (gal/hr) | APPROXIMATE COST* ($/1000 gal) |
|---|---|---|
| 1 | 2,772 | .04 |
| 10 | 15,501 | .40 |
| 25 | 36,692 | 1.00 |
| 50 | 72,087 | 2.00 |
| 60 | 86,224 | 2.40 |
| 75 | 107,488 | 3.00 |
| 90 | 128,712 | 3.60 |
| 99 | 141,453 | 3.96 |
| 100 | 142,868 | 4.00 |

*Values for a 20" long condenser

In order to compare the cost of operating the embodiment of FIG. 15 with the embodiment of FIG. 1 which includes an independent compressor 24, the cost of the FIG. 1 embodiment can be calculated to be about $2.97/1000 gal. Therefore, considering cost alone, the embodiment of FIG. 15 appears more efficient below 75% bypass. Of course, cost is not the only consideration since below 75% bypass the volume of condensate output levels attainable with the embodiment of FIG. 15 are significantly less than with the FIG. 1 embodiment. On the other hand, at low bypass levels, the savings in operational costs are so significant as compared with the FIG. 1 embodiment that it may be economical to build multiple FIG. 15 systems and operate the systems in tandem to increase the condensate output capability while still operating at a reduced cost/1000 gallons as compared to the FIG. 1 system. Operation of system 900 at a turbine bypass of from 10 to 75% by volume of the vapor flow appears to be most preferred.

While the present invention has been described with reference to particular embodiments thereof, it will be understood that numerous modifications can be made by those skilled in the art without actually departing from the scope of the invention. Accordingly all modifications and equivalents may be resorted to which fall within the scope of the invention as claimed.

We claim:

1. A method for high volume distillation of impure liquid comprising the steps of:
   a. evaporating said impure liquid in an evaporator to form a vapor at a temperature above the freezing point and at or below the boiling point of said liquid at atmospheric pressure and at a pressure corresponding to said evaporation temperature under saturated conditions;
   b. compressing said vapor adiabatically;
   c. admixing said compressed vapor under substantially isobaric conditions directly with hot gases having a temperature sufficiently greater than the temperature of the compressed vapor that the resulting vapor-gas mixture temperature is greater than the temperature of the compressed vapor prior to the mixing;
   d. passing said vapor-gas mixture through an expansion engine to motivate said engine and to produce shaft energy, whereby said vapor-gas mixture adiabatically expands and cools;
   e. compressing said expanded vapor-gas mixture adiabatically to a predetermined pressure corresponding to a predetermined temperature differential between said compressed vapor-gas mixture and said impure liquid;
   f. cooling said vapor-gas mixture in heat transfer relation with said impure liquid whereby said vapor at least partially condenses, transferring sufficient heat to said impure liquid for evaporating said liquid and to form a vapor having said temperature and pressure characteristics set forth in subparagraph (a) hereof; and
   g. collecting said condensed vapor.

2. A method, as claimed in claim 1, wherein said impure liquid is evaporated to form a vapor at a pressure in the range 0.006 atmospheres to 1 atmosphere.

3. A method, as claimed in claim 1, wherein said impure liquid is evaporated to form a vapor at a temperature in the range 15° C to 60° C.

4. A method, as claimed in claim 3, wherein said vapor has a pressure below atmospheric and corresponding to the saturated vapor pressure of the liquid at the vapor temperature.

5. A method, as claimed in claim 1, wherein said hot gases are injected under pressure into a mixing space for admixture with said compressed vapor.

6. A method, as claimed in claim 1, wherein said compressed vapor is admixed with hot clean combustion gases.

7. A method, as claimed in claim 6, wherein said hot clean combustion gases comprise carbon dioxide and steam.

8. A method, as claimed in claim 1, wherein shaft energy produced by said vapor-gas mixture in said expansion engine is used to compress said vapor.

9. A method, as claimed in claim 1, wherein said condensation of vapor occurs in said evaporator and said released heat is transferred to said impure liquid in said evaporator to evaporate said liquid.

10. A method, as claimed in claim 1, wherein said condensation of vapor occurs in a heat exchanger and said released heat is transferred to said impure liquid before said liquid enters said evaporator.

11. A method, as claimed in claim 10, wherein said liquid is evaporated by flash distillation in said evaporator.

12. A method, as claimed in claim 1, wherein a portion of the compressed vapor-gas mixture is diverted and collected prior to cooling to provide a source of high pressure, high temperature vapor.

13. A method, as claimed in claim 1, including the step of venting non-condensible gases from said collected condensed vapor.

14. A method, as claimed in claim 1, wherein a portion of the compressed vapor-gas mixture is diverted prior to cooling and said diverted vapor-gas mixture is admixed with said compressed vapor and said hot gases prior to passing said vapor-gas mixture through said expansion engine.

15. A method, as claimed in claim 1, wherein said evaporation occurs in a plurality of stages.

16. A method, as claimed in claim 1, wherein said evaporation is accomplished by vacuum distillation in said evaporator and said impure feed liquid is pre-heated prior to evaporation.

17. A method, as claimed in claim 16, wherein said pre-heating is accomplished by exchanging heat between said impure liquid and partially condensed vapor.

18. A method, as claimed in claim 1, wherein said energy for compressing said vapor-gas mixture is furnished from a source independent of said expansion engine.

19. A method, as claimed in claim 18, wherein said hot gases are clean combustion gases furnished by said source which furnishes energy for compressing said vapor-gas mixture.

20. A closed system for high volume distillation of impure liquids comprising:
 a. evaporator means, including means for supplying impure liquid feed thereto, for evaporating said impure liquid at a temperature at or below the boiling point of said liquid at atmospheric pressure and at a pressure corresponding to said evaporation temperature under saturated conditions;
 b. first compressor means receiving said vapor from said evaporator means for adiabatically increasing said vapor pressure and temperature;
 c. a mixing chamber for receiving said vapor from said first compressor means;
 d. means for supplying hot gases under pressure to said mixing chamber, said hot gases admixing with and transferring heat directly to said vapor from said first compressor means in said mixing chamber;
 e. expansion engine means motivated by said vapor-gas mixture, said engine being drivingly connected to said first compressor means whereby the work done by said vapor-gas mixture in adiabatically expanding in said expansion engine means is transmitted to said first compressor means;
 f. a second compressor receiving the vapor-gas mixture exhausting said expansion engine means for adiabatically increasing the vapor pressure and temperature thereof;
 g. means for driving said second compressor;
 h. condenser means in heat transfer relationship with said impure liquid feed for receiving said vapor-gas mixture from said second compressor and for at least partially condensing said mixture whereby the heat released by said mixture is transferred to said feed liquid to supply the heat energy necessary for evaporating said feed liquid;
 i. means for recovering condensate from said condenser means; and
 j. means for removing unevaporated liquid feed from said evaporator means.

21. A system, as claimed in claim 20, wherein said means for driving said second compressor is independent of said expansion engine means.

22. A system, as claimed in claim 21, wherein said means for driving said second compressor is a gas turbine engine.

23. A system, as claimed in claim 21, wherein said means for driving said second compressor comprises a combustion chamber wherein combustion of fuel and air takes place and combustion gases are produced, means for supplying fuel and air in desired proportions to said combustion chamber; third compressor means for drawing air into said combustion chamber; second expansion engine means motivated by said air and said combustion gases, said second expansion engine means including shaft means linking said second expansion engine means and said third compressor means whereby at least a portion of the shaft work produced by said second expansion engine means is transmitted to said third compressor means to operate said third compressor means, said shaft means also linking said second expansion engine means and said second compressor.

24. A system, as claimed in claim 20, wherein said means for supplying hot gases comprises gas supply means and gas injector means, said gas injector receiving gas from said gas supply means and injecting said gas into said mixing chamber.

25. A system, as claimed in claim 23, wherein said means for supplying hot gases comprises gas supply means and gas injector means, said gas injector means receiving gas from said gas supply means and injecting said gas into said mixing chamber, said system further including duct means connecting the exhaust of said second engine means and said gas injector means, said combustion chamber and said duct means comprising said gas supply means whereby said combustion gases produced in said combustion chamber are ducted to said mixing chamber for admixture with said vapor therein.

26. A system, as claimed in claim 24, wherein said gas injector means comprise at least one venturi injector.

27. A system, as claimed in claim 25, wherein said gas injector means comprise at least one venturi injector.

28. A system, as claimed in claim 25, further including means for sensing the temperature in said mixing chamber operatively associated with means for controlling flow of combustion gases between said combustion chamber and said mixing chamber.

29. A system, as claimed in claim 20, wherein said first expansion engine means is coaxial with said first compressor means and said mixing chamber is disposed therebetween.

30. A system, as claimed in claim 20, further including duct means for returning a portion of said compressed vapor-gas mixture to said mixing chamber.

31. A system, as claimed in claim 20, further including heat exchange means for pre-heating said liquid feed prior to entering said evaporator means.

32. A system, as claimed in claim 20, wherein said condenser means is disposed within said evaporator means in heat transfer relationship with said liquid feed in said evaporator means.

33. A system, as claimed in claim 20, wherein said evaporator means comprises at least one flash chamber and said condenser means comprises at least one heat exchanger for transferring heat between said condensing compressed vapor-gas mixture and said impure liquid feed whereby said impure liquid feed is heated sufficiently in said heat exchanger that it flashes upon exposure to the reduced pressure in said flash chamber.

34. A system, as claimed in claim 33, wherein said evaporator means comprises a plurality of flash chambers and said condenser means comprises a plurality of heat exchangers.

35. A system, as claimed in claim 34, wherein said flash chambers and said heat exchangers are arranged in series and said flash chambers and said heat exchangers alternate in said series arrangement whereby said feed liquid is alternately heated in a heat exchanger and evaporated at least in part in a flash chamber.

36. A system, as claimed in claim 35, further including pre-heating heat exchange means for pre-heating said liquid feed before it enters said first heat exchanger.

37. A system, as claimed in claim 34, wherein at least one heat exchanger and at least one flash chamber are arranged in series to form a heat-flash combination and a plurality of said heat-flash combinations are arranged in parallel whereby a portion of said impure liquid feed is heated and flashed in each combination.

38. A system, as claimed in claim 20, including means for regulating the vapor pressure in said evaporator means.

39. A system, as claimed in claim 20, including duct means for diverting a portion of said compressed vapor-gas mixture before said mixture enters said condenser means.

40. A system, as claimed in claim 20, wherein said first compressor means comprises a pair of coaxial compressors, variable clutch means and shaft means drivingly connected said coxial compressors through said clutch means.

41. A system, as claimed in claim 20, wherein said first compressor means comprises a pair of compressors arranged in tandem, variable clutch means, each said compressor independently and drivingly connected by a shaft means to said first expansion engine means through said clutch means.

42. A system, as claimed in claim 20, wherein said first expansion engine means comprises a pair of expansion engines arranged in tandem, variable clutch means, each of said expansion engines independently and drivingly connected via shaft means to said first compressor means through said clutch means.

43. A system, as claimed in claim 20, wherein said first compressor means comprises a centrifugal compressor.

44. A system, as claimed in claim 43, wherein said first compressor means comprises coaxial turbine and centrifugal compressors.

45. A system, as claimed in claim 20, wherein said first compressor means includes a free-wheeling compressor.

46. A system, as claimed in claim 45, wherein said first compressor means comprises a free-wheeling compressor and two turbine compressors downstream therefrom, said turbine compressors are arranged in tandem, each turbine compressor being drivingly connected to an expansion engine.

47. A system as claimed in claim 20, further including auxiliary turbine means drivingly connected to said first compressor means, said auxiliary turbine means including a conduit for gas flow therethrough, turbine blading in said conduit, said turbine blading drivingly linked to said first compressor means whereby gas flow through said conduit does work on said turbine blading which work is transmitted to said first compressor means.

48. A system, as claimed in claim 47, wherein said conduit is annularly disposed with respect to and separated from the space in which said vapor flows, said first compressor means is drivingly connected to said first expansion engine and said auxiliary turbine means through a shaft, said auxiliary turbine means includes a spindle supporting said blading and drivingly connected to said shaft.

49. A system, as claimed in claim 49, wherein said spindle is hollow and said vapor flows through said spindle.

50. A system, as claimed in claim 48, wherein said gas flowing in said conduit is dirty gas.

51. A system, as claimed in claim 47, further including auxiliary compressor means in said conduit drivingly connected to said auxiliary turbine means, said auxiliary compressor means drawing air through said conduit whereby said air flow together with said gas flow in said conduit motivates said auxiliary turbine means.

52. A system, as claimed in claim 48, including auxiliary compressor means disposed in said annular conduit, said auxiliary compressor means drivingly connected to said auxiliary turbine means through said shaft and including a spindle supporting compressor blading in said conduit.

53. A system, as claimed in claim 52, wherein said spindle is hollow and said vapor flows through said spindle.

54. A system, as claimed in claim 52, wherein said gas flowing in said conduit is dirty gas.

55. A method for high volume distillation of impure liquids comprising the steps of:
   a. evaporating said impure liquid in an evaporator to form a vapor at a temperature above the freezing point and at or below the boiling point of said liquid at atmospheric pressure and a pressure corresponding to said evaporation temperature under saturated conditions;

b. compressing said vapor adiabatically;

c. admixing a portion of said compressed vapor under substantially isobaric conditions directly with hot gases having a temperature sufficiently greater than the temperature of the compressed vapor that the resulting vapor-gas mixture temperature is greater than the temperature of the compressed vapor prior to mixing, said portion comprising from 0 to 99% by volume of said compressed vapor flow;

d. passing said portion of the vapor-gas mixture through an expansion engine to motivate said engine and to produce shaft energy whereby said vapor-gas mixture adiabatically expands and cools;

e. admixing the remainder of said compressed vapor directly with said expanded vapor-gas mixture to adiabatically expand said compressed vapor and to form a second vapor-gas mixture at ambient pressure and at a temperature corresponding thereto, said temperature and pressure of the second vapor-gas mixture being greater than that of the expanded vapor-gas mixture exiting said expansion engine and less than that of the remainder of said compressed vapor prior to admixing;

f. cooling said second vapor-gas mixture in that transfer relation with said impure liquid whereby said vapor in said mixture at least partially condenses, transferring sufficient heat to said impure liquid for evaporating said liquid and to form a vapor having said temperature and pressure characteristics set forth in sub-paragraph (a) hereof; and g. collecting said condensed vapor.

56. A method, as claimed in claim 55, wherein said impure liquid is evaporated to form a vapor at a pressure in the range 0.006 atmospheres to 1 atmosphere.

57. A method, as claimed in claim 55, wherein said impure liquid is evaporated to form a vapor at a temperature in the range 15° C to 60° C.

58. A method, as claimed in claim 55, wherein said vapor has a pressure below atmospheric and corresponding to the saturated vapor pressure of the liquid at the vapor temperature.

59. A method, as claimed in claim 55, wherein said shaft energy produced by said vapor-gas mixture in said expansion engine is used to compress said vapor.

60. A method, as claimed in claim 55, wherein a portion of the second vapor-gas mixture is diverted and collected prior to cooling to provide a source of high pressure, high temperature vapor.

61. A method, as claimed in claim 55, wherein the portion of said compressed vapor admixing with said hot gases is from 25% to 90% by volume.

62. A closed system for high volume distillation of impure liquids comprising:

a. evaporator means, including means for supplying impure liquid feed thereto, for evaporating said impure liquid at a temperature at or below the boiling point of said liquid at atmospheric pressure and a pressure corresponding to said evaporation temperature under saturated conditions;

b. first compressor means receiving said vapor from said evaporator means for adiabatically increasing said vapor pressure and temperature;

c. a first mixing chamber for receiving a portion of said vapor from said first compressor means;

d. means for supplying hot gases under pressure to said first mixing chamber, said hot gases admixing with and transferring heat directly to said vapor portion from said first compressor means in said first mixing chamber;

e. expansion engine means motivated by said vapor-gas mixture, said engine being drivingly connected to said first compressor means whereby the work done by said vapor-gas mixture in adiabatically expanding in said expansion engine means is transmitted to said first compressor means;

f. a second mixing chamber for receiving the vapor-gas mixture exhausting from said expansion engine means;

g. by-pass duct means for diverting the remainder of said compressed vapor from said first compressor means around said first mixing chamber and said expansion engine means to said second mixing chamber, said by-pass compressed vapor admixing with and transferring heat directly to said vapor-gas mixture exiting said expansion engine means to form a second vapor-gas mixture;

h. condenser means in heat transfer relationship with said impure liquid feed for receiving said second vapor-gas mixture from said second mixing chamber and for at least partially condensing said second vapor-gas mixture whereby the heat released by said mixture is transferred to said feed liquid to supply the heat energy necessary for evaporating said feed liquid;

i. means for recovering condensate from said condenser means; and j. means for removing unevaporated liquid feed from said evaporator means.

63. A system, as claimed in claim 62, wherein said means for supplying hot gases comprises gas supply means and gas injector means, said gas injector means receiving gas from said gas supply means and injecting said gas into said first mixing chamber.

64. A system, as claimed in claim 63, wherein said gas injector means comprise at least one venturi injector.

65. A system, as claimed in claim 62, wherein said expansion engine means is coaxial with said first compressor means and said first mixing chamber is disposed therebetween.

66. A system, as claimed in claim 62, including means for controlling the portion of said compressed vapor flow diverted into said by-pass duct means.

67. A system, as claimed in claim 62, wherein said by-pass duct means include by-pass arms and vapor injector means at the end of said arms remote from said first compressor means, said vapor injector means injecting said by-pass vapor into said second mixing chamber.

68. A system, as claimed in claim 67, wherein said vapor injector means comprise at least one venturi injector.

* * * * *

UNITED STATES PATENT AND TRADEMARK OFFICE
CERTIFICATE OF CORRECTION

PATENT NO. : 4,035,243
DATED : July 12, 1977
INVENTOR(S) : JEROME KATZ and SIDNEY J. FOGEL It is certified that error appears in the above—identified patent and that said Letters Patent are hereby corrected as shown below:

Claim 49, line 1, "claim 49" should be --claim 48--.

Signed and Sealed this

Sixth Day of November 1979

[SEAL]

Attest:

RUTH C. MASON
Attesting Officer

LUTRELLE F. PARKER
Acting Commissioner of Patents and Trademarks